United States Patent
Horio et al.

(10) Patent No.: US 9,213,521 B2
(45) Date of Patent: Dec. 15, 2015

(54) CONTROL METHOD OF INFORMATION PROCESSING APPARATUS AND INFORMATION PROCESSING APPARATUS

(71) Applicant: Fujitsu Limited, Kawasaki-shi, Kanagawa (JP)

(72) Inventors: Kenichi Horio, Yokohama (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 373 days.

(21) Appl. No.: 13/794,983

(22) Filed: Mar. 12, 2013

(65) Prior Publication Data

US 2013/0300633 A1    Nov. 14, 2013

(30) Foreign Application Priority Data

May 14, 2012   (JP) .................................. 2012-111014

(51) Int. Cl.
*H04L 12/26*    (2006.01)
*G06F 3/14*    (2006.01)

(52) U.S. Cl.
CPC ............ *G06F 3/1454* (2013.01); *G06F 3/1462* (2013.01); *G09G 2340/02* (2013.01); *G09G 2350/00* (2013.01); *G09G 2370/022* (2013.01)

(58) Field of Classification Search
None
See application file for complete search history.

(56) References Cited

U.S. PATENT DOCUMENTS

| | | | | |
|---|---|---|---|---|
| 5,907,556 | A  * | 5/1999 | Hisanaga et al. | 370/468 |
| 6,498,783 | B1 * | 12/2002 | Lin | 370/252 |
| 7,532,642 | B1 * | 5/2009 | Peacock | 370/468 |
| 2006/0045023 | A1 | 3/2006 | Kim et al. | |
| 2011/0276653 | A1 | 11/2011 | Matsui et al. | |
| 2013/0114421 | A1 * | 5/2013 | Qian et al. | 370/252 |

FOREIGN PATENT DOCUMENTS

| | | |
|---|---|---|
| JP | 2006-74773 | 3/2006 |
| JP | 2006-237837 | 9/2006 |
| JP | 2011-238014 | 11/2011 |

* cited by examiner

*Primary Examiner* — Alex Skripnikov
(74) *Attorney, Agent, or Firm* — Oblon, McClelland, Maier & Neustadt, L.L.P.

(57) ABSTRACT

A control method of an information processing apparatus includes receiving image information and a first index associated with the image information transmitted from another information processing apparatus, the first index regarding a time when the other information processing apparatus transmits the image information, calculating a communication index regarding bandwidth of a network between the information processing apparatus and the other information processing apparatus on a basis of the first index, a second index, and size of the image information, the second index regarding a time when the information processing apparatus receives the image information, and transmitting the communication index to the other information processing apparatus.

11 Claims, 14 Drawing Sheets

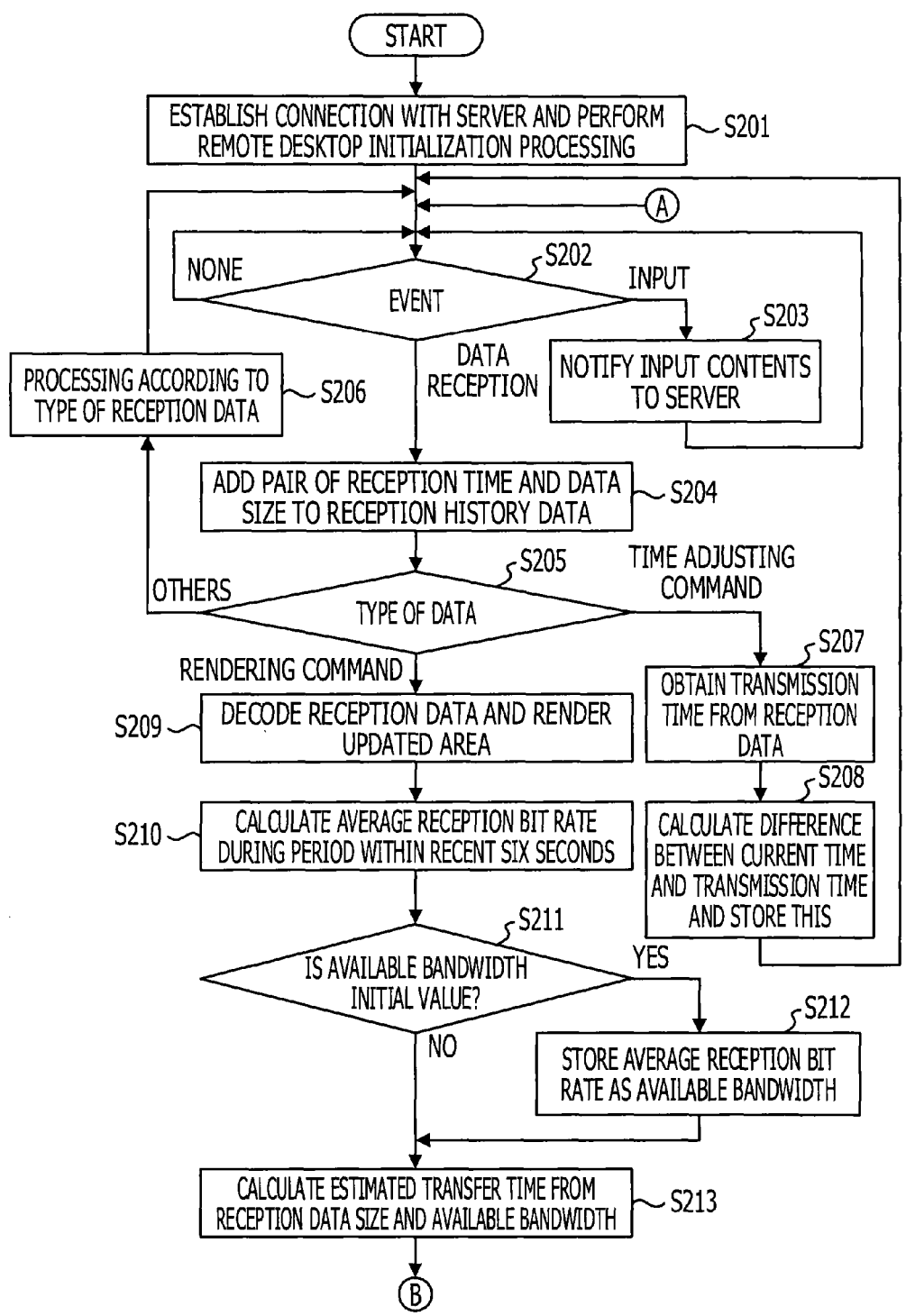

CONTROL METHOD OF INFORMATION PROCESSING APPARATUS AND INFORMATION PROCESSING APPARATUS

CROSS-REFERENCE TO RELATED APPLICATION

This application is based upon and claims the benefit of priority of the prior Japanese Patent Application No. 2012-111014, filed on May 14, 2012, the entire contents of which are incorporated herein by reference.

FIELD

The embodiments discussed herein are related to a control method of an information processing apparatus and an information processing apparatus.

BACKGROUND

With a certain type of thin client system, technology to remotely control updating of a screen of a computer is employed. For example, familiar protocols to be used for remote control of a screen include RDP (Remote Desktop Protocol) and RFB (Remote Frame Buffer) protocol.

For example, with a certain type of thin client system, the server generates data for having a thin client render a screen, and transmits the generated data to the thin client. The server repeats generation and transmission of data as described above, thereby remotely controlling updating of a screen of the thin client.

Recently, thin client systems have attracted attention from some perspectives such as a perspective to suppress leakage of information from a computer, a perspective to reduce maintenance cost of a computer, and so forth. Usage for thin client systems is spreading, and variously studies regarding thin client systems are being performed.

For example, the following technology has been proposed with is as an issue to improve operation response while maintaining versatility of a thin client.

An information processing device according to this technology includes image memory, a change frequency discriminating unit, a first image transmission unit, a high-frequency change area identifying unit, a transmission stopping unit, and a second image transmission unit. The image memory holds an image to render an execution result of a computer. The change frequency discriminating unit divides an image rendered in the image memory into multiple areas, and discriminates frequency in change between frames for each area.

The first image transmission unit transmits an image of a changed area. The high-frequency change area identifying unit identifies an area of which the frequency in change exceeds a threshold as a high-frequency change area. The transmission stopping unit stops transmission at the first image transmission unit regarding an identified area. The second image transmission unit subjects the image of an identified area to moving image compression processing of which the compression rate is higher than that of the first image transmission unit and transmits this.

Incidentally, remote control of updating of a screen accompanies network communication. For example, with a certain type of thin client system, the server transmits data for remotely controlling updating of a screen a thin client to the thin client via a network. Length of time since the server transmitted data until the thin client receives the data depends on network conditions. Accordingly, fairly long display delay may occur depending on network conditions.

On the other hand, technology for recognizing network conditions is also variously studied. For example, network conditions may be represented with the available bandwidth of a network or may be represented with route cost on a network. With regard to available bandwidth or route cost, the following technology has been proposed, for example.

A certain method is a method for measuring the available bandwidth of a network with high speed and high precision. According to this method, multiple cyclic timestamp packets are transmitted to a communication device on the reception side with an examination transmission rate that has currently been set. Based on time when each of the timestamp packets is received at the communication device on the reception side, change tendency of transmission delay time difference between timestamp packets is inspected.

In the event that the transmission delay time difference is not included in a predetermined stable range, and also exhibits an increasing trend, inspections are repeated after decreasing the value of the examination transmission rate. On the other hand, in the event that transmission delay time difference is not included in the stable range, and also exhibits a declining trend, inspections are repeated after increasing the value of the examination transmission rate. As results of processing as described above, in the event that the transmission delay time difference is included in the stable range, the examination transmission rate that has currently been set is determined as available bandwidth.

Also, the following system has also been proposed relating to route cost. This system is a system to select the optimal route in the event that there are multiple routes to reach the same node. Specifically, this system is a system to select the optimal route in a multi-node network including a first route from the start-point node to the end-point node via a first node, and a second route from the start-point node to the end-point node via a second node. This system includes a storage unit and a route measurement optimizing unit.

The storage unit stores link cost. Also, the route measurement optimizing unit compares first roust cost and second route cost to select a route with lower cost, thereby optimizing the route. Note that the first route cost is specifically, calculated based on start-point node cost, first link cost, first node cost, second link cost, and end-point node cost. Also, the second route cost is calculated based on start-point node cost, third link cost, second node cost, fourth link cost, and end-point node cost.

With a certain type of system, an image to be displayed on the screen of a first computer is generated by a second computer. In this case, the second computer transmits screen information to cause the first computer to display the image on the screen, to the first computer. Next, the first computer receives the screen information, and displays the image on the screen in accordance with the screen information. Generation of an image, transmission of screen information, and display of an image as described above may repeatedly be performed.

Specifically, generation of an image at the second computer is based on input given to the first computer via an input device of the first computer. The first computer transmits notification regarding input to the second computer, and the second computer executes, in response to notified input, one or more programs. The second computer generates, in response to executions of one or more programs, an image as described above.

In the event that the first and second computers have operated as described above, this is recognized by a user for the first computer as follows. Specifically, this is recognized by the user such that, in response to input given to the first computer by the user via the input device, the screen of the first computer is updated.

In this case, length of time since the user gave input to the first computer via the input device until the first computer displays an image on the screen in response to screen information affects on usability. The length of this time depends on network conditions between the first and second computers. Therefore, it is desirable that some sort of control according to the network condition be performed in order to suppress deterioration in usability even if the network condition is poor.

On the other hand, in order to control according to the network condition, if additional communication to recognize the network condition is excessively performed, the network condition may become worse. This is because load for the network is further increased due to additional communication. Deterioration in the network condition results in deterioration in usability. Accordingly, it is desirable that the amount of additional communication is not great as a point of view for usability in the system including the first and second computers as described above.

Japanese Laid-open Patent Publication Nos. 2011-238014, 2006-74773, and 2006-237837 are examples of the related art of the present technology.

SUMMARY

According to an aspect of the invention, a control method of an information processing apparatus includes receiving image information and a first index associated with the image information transmitted from another information processing apparatus, the first index regarding a time when the other information processing apparatus transmits the image information, calculating a communication index regarding bandwidth of a network between the information processing apparatus and the other information processing apparatus on a basis of the first index, a second index, and size of the image information, the second index regarding a time when the information processing apparatus receives the image information, and transmitting the communication index to the other information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a first client operation flowchart according to a second embodiment;

DESCRIPTION OF EMBODIMENTS

Hereinafter, embodiments will be described in detail with reference to the drawings. Specifically, a first embodiment will be described with reference to FIGS. 1 to 4. Next, description will be made regarding a hardware configuration which may be applied to any of first to fourth embodiments, with reference to FIG. 5. Thereafter, a second embodiment will be described with reference to FIGS. 6 to 12, a third embodiment will be described with reference to FIG. 13, and a fourth embodiment will be described with reference to FIG. 14. Also, some modifications will also be described.

Figure 1:
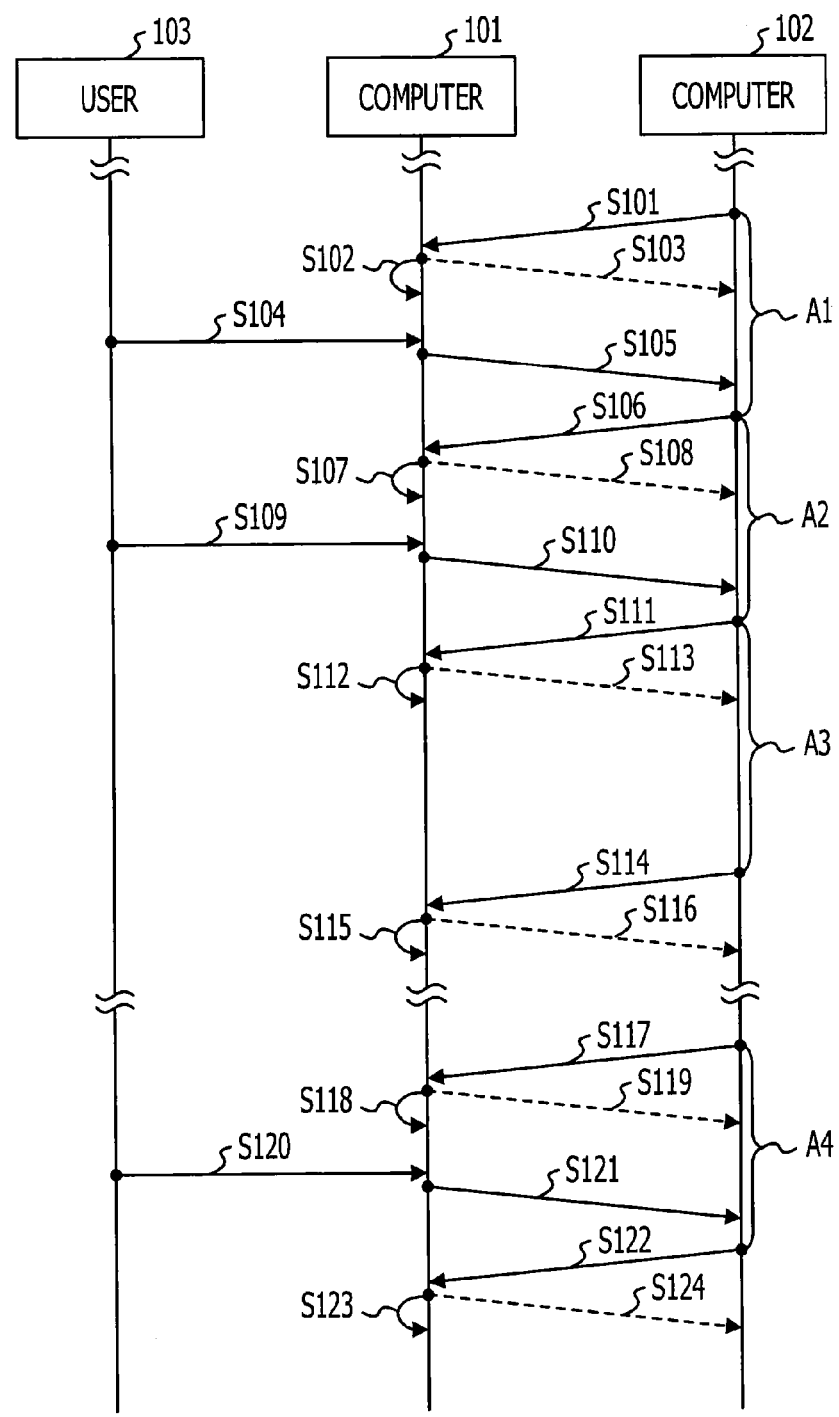
FIG. 1 is a sequence chart illustrating an operation example of a first embodiment.

FIG. 1 is a sequence chart illustrating an operation example of the first embodiment. In FIG. 1, there are exemplified operations of a computer 101, a computer 102, and a user 103. Steps S101 to S124 are exemplified in FIG. 1, but before sequentially describing these steps, a brief overview of the operations of the computers 101 and 102 will be described first.

The computers 101 and 102 are connected via a network. For example, the computer 101 may be a client in a thin client system, and the computer 102 may be a server. More specifically, the computer 102 may be a server which remotely controls updating of the screen of the computer 101 in the thin client system (in other words, server which provides a remote desktop service).

For example, as exemplified in steps S104, S109, and S120 in FIG. 1, input is given from the user 103 to the computer 101 via the input device of the computer 101. In response to this, as exemplified in steps S105, S110, and S121 for example, the computer 101 transmits notification regarding the given input to the computer 102, and the computer 102 receives this notification.

The computer 102 executes one or more programs according to the notified input. The computer 102 then generates an image to be displayed on the screen of the computer 101 according to executions of one or more programs thereof.

For example, upon the user 103 performing an input operation to activate a certain application, the computer 101 notifies this input operation to the computer 102. Accordingly, the computer 102 starts execution of this application. Along with start of execution of the application, for example, the computer 102 may perform processing to display a certain window on the screen (i.e., processing to generate an image of the entire screen including this window).

Also, upon the user 103 performing an input operation on the window of the activated application, the computer 101 notifies this input operation to the computer 102. The computer 102 then executes processing according to this input operation in a process of execution of this application.

For example, in a situation in which a text editor is executed in the foreground, the user may perform a key input operation. In this case, the computer 102 executes processing to display a character in a cursor position within the window of the text editor according to the notification from the computer 101

(i.e., processing to generate an image such that a new character is added to the cursor position).

Depending on the type of the activated application, while there is no input notification from the computer 101, the computer 102 may suspend execution of this application. It goes without saying that the computer 102 may also continue execution of the program even if there were no input notification from the computer 101.

For example, in the event that a media player to view and listen to a moving image has been activated, upon the user 103 clicking a play button, a click operation is notified from the computer 101 to the computer 102. The computer 102 starts, in order to play the moving image, processing to update within the window of the media player. After the user 103 clicks the play button, even if no operation were performed, the computer 102 continues to update the inside of the window of the media player. Also, for example, in the event that the OS (Operating System) provides a function to display time on the screen, the computer 102 may perform processing to update time display on the screen according to elapse of time regardless of input notification.

The computer 102 executes, for example, one or more programs as exemplified above, and repeatedly generates an image to be displayed on the screen of the computer 101 according to execution of one or more programs thereof. For example, in the event that resolution of the screen of the computer 101 is 1280×1024 pixels, the computer 102 repeatedly generates an image of 1280×1024 pixels.

The computer 102 then transmits information to the computer 101 to display the generated image on the screen of the computer 101 (hereinafter, referred to as "screen information" as appropriate). The computer 102 also further transmits time information that indicates first time for transmitting the screen information to the computer 101.

The computer 102 may include the screen information and time information in one packet. With the example in FIG. 1, in steps S101, S106, S111, S114, S117, and S122, the computer 102 transmits the screen information and time information to the computer 101.

Also, upon receiving the screen information, the computer 101 updates the screen in accordance with the screen information. For example, with the example in FIG. 1, in steps S102, S107, S112, S115, S118, and S123, the computer 101 updates the screen in accordance with the received screen information.

Note that the specific form of the screen information may vary according to embodiments. Hereinafter three format examples of the screen information will be described.

The first format is a format including one or more commands to update at least a portion of the screen. For example, the screen information in the first format may include one or more commands such as the following (1a) to (1c).

(1a) Command to render a vector object such a command for commanding to draw a line from a certain point to a certain point (1b) Command to command to display a certain particular character with a certain particular font on at certain particular coordinates (1c) Command to command to replace a particular area within the screen with a certain still image With an embodiment wherein the screen information in the first format is used, upon receiving the screen information, the computer 101 updates the screen in accordance with the command included in the screen information.

The second format is a format including data obtained by compressing the entire screen of the computer 101 in accordance with a compression algorithm for moving images. For example, in order to update the screen of the computer 101 with a frame rate of 30 fps (frames per second), data of a moving image with a frame rate of 30 fps may be transmitted as the screen information. For example, a data format such as MPEG (Moving Picture Expert Group) format or the like is available.

With an embodiment wherein the screen information in the second format is used, upon receiving the screen information, the computer 101 decodes compressed moving image data included in the screen information, and displays the frame images on the screen. The computer 101 updates the screen by displaying the frame images on the screen one after the other.

The third format is a hybrid format of the first and second formats as will be described below in detail. The third format has an advantage to suppress accumulation of delay even if updating of the screen occurred with high frequency, and an advantage to decrease load for compression processing at the computer 102. Accordingly, it is desirable that the screen information is transmitted in the third format.

For example, updating of the screen may occur with high frequency such that a media player is used to play a moving image. In the event that updating of the screen occurs with high frequency, with the first format, the screen information with to some extent big size is transmitted from the computer 102 to the computer 101 with high frequency.

Depending on available bandwidth between the computers 101 and 102, the screen information may be retained on a route from the computer 102 to the computer 101 (e.g., transmission buffer within the computer 102, buffer within a router on the route, etc.). As a result thereof, delay time is gradually prolonged and usability may deteriorate.

On the other hand, with the second format, a compression algorithm for moving images is used. With compression of a moving image, inter-frame prediction or motion compensation or the like is performed. Therefore, in the event that updating of the screen occurs with high frequency, the second format suppresses increase in the amount of data in most cases as compared to the first format. Accordingly, when the second format is employed, accumulation of delay as described above may not be caused in most cases.

However, compression of a moving image is processing of a relatively great load. Accordingly, for example, with a system wherein one server remotely controls screens of multiple clients, when the second format is employed, the load of the server may increase greatly. In other words, with a system wherein the one computer 102 remotely controls screens of a great number of computers similar to the computer 101, when the second format is employed, the load of the computer 102 may increase greatly.

In order to handle a great load, a hardware circuit only for compression of moving images (e.g., ASIC (Application-Specific Integrated Circuit), etc.) may be provided to the computer 102. However, providing a dedicated hardware circuit to the computer 102 leads to undesirable increase in manufacturing cost of the computer 102.

Therefore, in order to realize reduction in the processing load of the computer 102 while suppressing accumulation of delay, the third format that is a hybrid format combined from the first format and second format as appropriate may be employed. When the third format is employed, specifically, the first and second formats may be combined as follows.

The second format is applied to an area where updating within the screen occurs with high frequency. Thus, accumulation of delay may be suppressed.

On the other hand, the first format is applied to an area where frequency in updating is low. That is to say, a range to which the second format is applied is restricted. In many cases, processing to compress a moving image that occupies a small range on the screen is low in load as compared to processing to compress a moving image that occupies a great range on the screen. Accordingly, load of the computer 102 may be reduced by restricting a range to which the second format is applied.

In the event that load of compression of moving images is not so high, the computer 102 may sufficiently handle compression of moving images with a processor for general purpose even without a dedicated hardware circuit for compression. Accordingly, restricting a range to which the second format is applied lead to avoiding increase in manufacturing cost of the computer 102.

Figure 2:
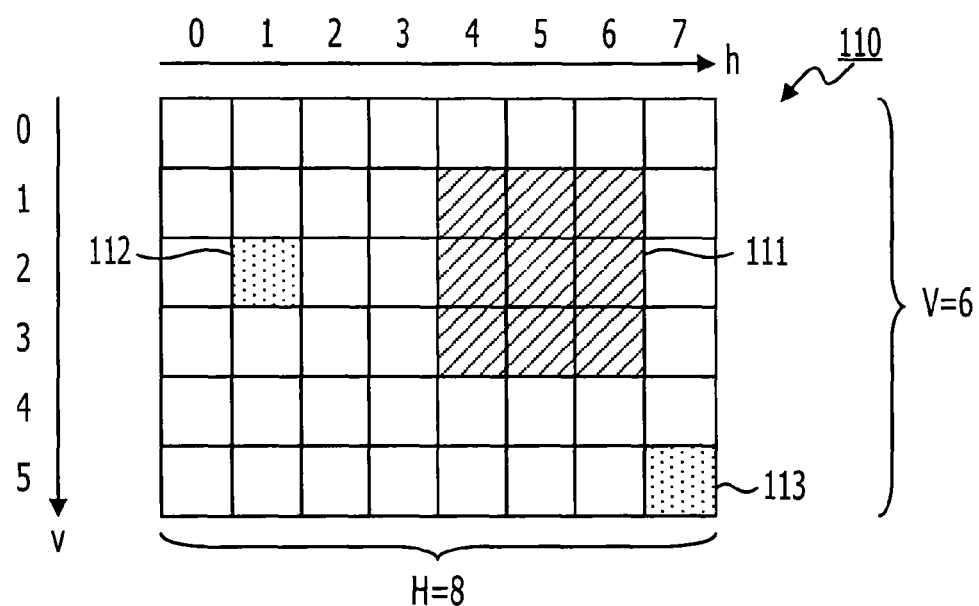
FIG. 2 is a diagram for describing updating of a screen.

As described above, the third format is a format combined from the first and second formats according to frequency where updating occurs. Now, in order to describe a specific example of the screen information in the third format, FIG. 2 will be referenced. FIG. 2 is a diagram for describing updating of the screen.

As illustrated in FIG. 2, a screen 110 may be divided into H blocks in the horizontal direction and divided into V blocks in the vertical direction. In this case, the screen 101 includes V×H blocks in total. With the example in FIG. 2, though V=6 and also H=8, if 2≤V and also 2≤H, the values of V and H may be any value.

FIG. 2 illustrates, for convenience of reference, an h axis in the horizontal direction and a V axis in the vertical direction. Also, FIG. 2 also illustrates index numbers in the h-axis direction and index numbers in the v-axis direction, which are to reference the blocks. Hereinafter, for example, a block (1, 2) or the like may be expressed using two index numbers.

Specifically, the example in FIG. 2 is an example in the event that when comparing the screen 110 at first time point and the screen at second time point later than the first time point, change is detected in areas 111 to 113 indicated in (2a) to (2c).

(2a) Area 111 made up of block (4, 1), block (5, 1), block (6, 1), block (4, 2), block (5, 2) and block (6, 2), block (4, 3), block (5, 3), and block (6, 3)

(2b) Area 112 made up of block (1, 2)

(2c) Area 113 made up of block (7, 5)

For convenience of description, a time point prior to the first time point will be referred to as "third time point", and will be assumed as the following (3a) to (3c).

(3a) Change occurs with high frequency in the area 111 during a period between the third time point and the second time point. For example, a number of times of change equal to or greater than a certain threshold occurs during this period in any block included in the area 111.

(3b) Frequency is low where change occurs at the area 112 during a period between the third time point and the second time point. For example, the number of times of change that occurs during this period in the block (1, 2) is below the threshold.

(3c) Frequency is low where change occurs at the area 113 during a period between the third time point and the second time point. For example, a number of times of change that occurs during this period in the block (7, 5) is below the threshold.

In FIG. 2, a block where change has not occurred during from the first time point to the second time point is indicted with white. Also, in FIG. 2, a block where frequency in change is low during the above-mentioned period though change occurs from the first time point to the second time point is indicated with a halftone-dot pattern. In FIG. 2, a block where change occurs from the first time point to the second time point, and also frequency in change during the above-mentioned period is high is indicated with a shaded pattern.

Under assumption of the above-mentioned (3a) to (3c), the second format is applied to the area 111, and the first format is applied to the areas 112 and 113. More specifically, the screen information in the third format to display the screen 110 at the second time point on the computer 101 may include the following (4a) to (4c) data.

(4a) Data that is data compressed from the area 111 in accordance with a compression algorithm for moving images, including the area 111 at the second time point as a frame image (e.g., one sheet of picture)

(4b) Data of still image of the area 112 at the second time point (4c) Data of still image of the area 113 at the second time point It goes without saying that, with regard to the areas 112 and 113, a command for displaying a vector object or characters may be used instead of data of a still image in (4b) and (4c).

Note that, in order to adjust an area to which the second format is applied to obtain a rectangle, a block where no change has occurred during a period from the first time point to the second time point, or a block where frequency in change is low during a period from the third time point to the second time point may be include in an object to which the second format is applied. For example, with the example in FIG. 2, the area 111 includes nine blocks, but frequency in change in the nine blocks is not restricted to the same. For example, there may be a case where the following (5a) and (5b) are both realized.

(5a) With the block (6, 1), no change has occurred from the first time point to the second time point. Also, with the block (6, 1), change has occurred from the first time point to the second time point, but frequency in change during a period from the third time point to the second time point is low.

(5b) With the remaining eight blocks, change has occurred from the first time point to the second time point, and moreover, frequency in change during a period from the third time point to the second time point is high.

In the event that the above-mentioned (5a) and (5b) are both realized, the computer 102 may adjust the area to which the second format is applied to obtain a rectangle by adding the block (6, 1) to the eight blocks described in (5b). The computer 102 may apply compression according to a compression algorithm for moving images to the rectangular area 111.

As described above, it is desirable that the screen information has the third format combined from the first and second formats according to frequency in change. However, the screen information may have the first or second format.

Incidentally, even if the screen information had any format, with the first embodiment, the computer 102 transmits the screen information with frequency based on a value notified from the computer 101. That is to say, with the first embodiment, the computer 101 may remotely control frequency for the computer 102 transmitting the screen information by determining a value to be notified to the computer 102.

Here, to control frequency for the computer 102 transmitting the screen information is, in other words, to control the amount of the screen information to be transmitted from the computer 102 to the computer 101 per unit time. Accordingly, the computer 101 may control the amount of communication traffic according to the network condition by suitably determining a value to be notified to the computer 102 according to the network condition.

Specifically, with the first embodiment, the computer 101 notifies an estimated value for available bandwidth of the network between the computers 101 and 102, or an index value to reflect updating of the estimated value to the computer 102. The computer 102 transmits the screen information with frequency based on the notified estimated value or index value.

The computer 101 decides an estimated value for available bandwidth according to a situation.

For example, when first receiving the screen information, the computer 101 may initialize the estimated value for available bandwidth. More specifically, when first receiving the screen information, the computer 101 may calculate a reception bit rate using the following values in (6a) and (6b) to use the reception bit rate as the initial value of the estimated value for available bandwidth.

(6a) Difference between time when the computer 101 received the first screen information and time that time information corresponding to the first screen information indicates (i.e., time when the computer 102 transmitted the first screen information)

(6b) Size of the first screen information

Also, when receiving the screen information at the second time and thereafter, the computer 101 increases or maintains or decreases the estimated value for available bandwidth according to difference between the above-mentioned time in (7a) and time in (7b).

(7a) Time when the computer 101 actually received the screen information (7b) Time estimated for the computer 101 receiving the screen information In other words, the computer 101 increases or maintains or decreases the estimated value for available bandwidth according to difference between time actually involved in from transmission to reception of the screen information, and time estimated for from transmission to reception of the screen information.

The above-mentioned time in (7a) depends on network conditions. Also, difference between the time in (7a) and the time in (7b) is changed according to how much the estimated value of available bandwidth preferably reflects the network condition. Accordingly, to decide the estimated value for available bandwidth according to the difference between the time in (7a) and the time in (7b) is, in other words, to decide the estimated value for available bandwidth according to the network condition.

Note that the above-mentioned time in (7b) is specifically time estimated from the following values in (8a) to (8c).

(8a) Current estimated value for available bandwidth (8b) Size of the screen information received by the computer 101

(8c) Time indicated with time information corresponding to this screen information, i.e., time when this screen information was transmitted from the computer 102

For example, in the event that the difference between the time in (7a) and the time in (7b) is greater than a positive first threshold, the computer 101 may decrease the estimated value for available bandwidth. This is because in the event that the actual reception time is significantly later than the estimated reception time, there is a great possibility that the available bandwidth is being estimated excessively great. Accordingly, in this case, the computer 101 may decrease the estimated value for available bandwidth.

Also, let us say that an appropriate value less than a first threshold has been determined as a second threshold. In the event that the difference between the time in (7a) and the time in (7b) is at or below the second threshold, the available bandwidth may excessively be estimated. Accordingly, in this case, the computer 101 may increase the estimated value for available bandwidth. More specifically, it is desirable that the second threshold is 0 or negative.

In the event that the difference between the time in (7a) and the time in (7b) is greater than the second threshold but equal to or below the second threshold, the computer 101 may maintain the estimated value for available bandwidth.

Note that, in the event of decreasing the estimated value for available bandwidth, the computer 101 specifically decreases the estimated value for available bandwidth based on a reception bit rate to be calculated from values of the following (9a) and (9b).

(9a) Size of each screen information that the computer 101 receives once or more with in a certain period (9b) Length of the above-mentioned period It is difficult to accurately observe the actual available bandwidth of point-to-point between the computers 101 and 102. However, an average of the actual available bandwidth during a certain period is at least equal to or greater than an average reception bit rate during this period. Accordingly, the computer 101 may employ the actual average reception bit rate during this period as the lower limit value of the available bandwidth during this period. Specifically, it is desirable that the computer 101 decreases the estimated value based on the reception bit rate as described above.

On the other hand, in the event of increasing the estimated value for available bandwidth, for example, the computer 101 may increase the estimated value with a predetermined ratio. Alternatively, the computer 101 may increase the estimated value by adding a predetermined value to the estimated value.

Also, in the event that the latest reception bit rate to be calculated from the following values in (10a) to (10c) is to some extent large, the computer 101 may increase the estimated value for available bandwidth according to the latest reception bit rate.

(10a) Transmission time indicated with time information regarding the screen information lastly received by the computer 101

(10b) Time when the computer 101 lastly received the screen information (10c) Size of the screen information lastly received by the computer 101

For example, a decision criterion value greater than the estimated value may be decided based on the estimated value for available bandwidth. For example, fixed multiple of the current estimated value may be decided as the decision criterion value using a greater constant than 1. In the event that the latest reception bit rate is greater than the decision criterion value, the actual available bandwidth may rapidly have increased recently. Also, the latest reception bit rate may be taken as the lower limit value of the latest available bandwidth.

Accordingly, the computer 101 may increase the estimated value for available bandwidth according to the latest reception bit rate regardless of the difference between the time in (7a) and the time in (7b). It goes without saying that the computer 101 may increase the estimated value for available bandwidth by taking both of the difference between the time in (7a) and the time in (7b) and the latest reception bit rate into consideration.

In the event of having updated at least the estimated value for available bandwidth by increase or decrease, the computer 101 notifies the index value to reflect the estimated value or updating of the estimated value to the computer 102. The index value may be a value that indicates difference between the estimated value after updating and the estimated value before updating, for example.

For example, with the example in FIG. 2, as illustrated in steps S103, S108, S113, S116, S119, and S124, the computer 101 notifies the estimated value to the computer 102 each time the computer 101 receives the screen information and time information. Depending on the embodiment, the computer 101 may not notify the estimated value to the computer 102 in the even of maintaining the estimated value.

Also, in the event of having increased the estimated value, the computer 101 may notify the index value that indicates increase in the estimated value in an enhanced manner to the computer 102. For example, the computer 101 may determine the index value further greater than the increased estimated value to notify the index value to the computer 102.

Depending on the embodiment, in the event of maintaining the estimated value, the computer 101 may notify a value greater than the estimated value to the computer 102 instead of the estimated value itself. For example, in the event that the difference between the time in (7a) and the time in (7b) is not greater than a predetermined threshold, the computer 101 may notify a value greater than the estimated value to the computer 102 without changing the estimated value itself.

The computer 102 may not distinguish whether the computer 101 has notified the estimated value itself or a value other than the estimated value to the computer 102. The computer 102 may simply adjust frequency for transmitting the screen information according to the value notified from the computer 101. Specifically, the greater the value notified from the computer 101 is, the more the computer 102 increases the frequency for transmitting the screen information. However, the frequency may have the upper limit.

As described above, according to the first embodiment, the frequency for transmitting the screen information from the computer 102 to the computer 101 is adjusted according to the estimated value for available bandwidth to reflect the network condition. That is to say, with the first embodiment, the volume of communication traffic is adjusted according to the network condition. Accordingly, there is avoided a situation in which delay is accumulated due to excessive communication traffic. That is to say, deterioration in usability due to accumulation of delay is avoided.

Also, as described above, with the first embodiment, there is employed approach which reduces the volume of communication traffic by decreasing the frequency for transmitting the screen information instead of decreasing the volume of communication traffic by deteriorating the quality of an image (still image, moving image, or both thereof). Therefore, the quality of an image to be displayed on the screen of the computer 101 for each moment is maintained. Maintaining the quality of an image has an advantage to suppress deterioration in usability.

For example, reduction in the volume of communication traffic may be realized by deteriorating image quality such as reducing color depth or coarsening quantization in compression encoding. However, upon the image quality deteriorating, for example, a problem may be caused such that characters are displayed blurred on the screen of the computer 101, and accordingly, the user 103 does not read the characters. The user not being able to read characters directly results in deterioration in usability. Also, in the event that the user 103 desires to employ an application to treat high-definition images (still images, moving images, or both thereof), deterioration in image quality significantly deteriorates usability.

Accordingly, from a viewpoint of usability, it is not desirable that image quality is deteriorated. In other words, approach to realize reduction in the volume of communication traffic by adjusting the frequency as with the first embodiment has an advantage to suppress deterioration in usability even with a poor network condition.

Next, description will be made regarding an example of a specific operation sequence that may be generated by the computers 101 and 102 operating as described above, with reference to FIG. 1.

Though time prior to step S101 is omitted in FIG. 1, as described above, the computer 102 is executing one or more programs according to a notification from the computer 101, and generates an image to be displayed on the screen of the computer 101. In step S101, the computer 102 generates screen information based on the generated image, and transmits the screen information and time information.

In response to this, in step S102 the computer 101 updates the screen in accordance with the screen information. Also, in step S103, the computer 101 estimates the time in (7b) from the above-mentioned values in (8a) to (8c), and increases, maintains, or decreases the estimated value for available bandwidth according to the difference between the time in (7a) and the time in (7b). Next, the computer 101 notifies the estimated value for available bandwidth to the computer 102.

Note that the computer 101 may first execute any of steps S102 and S103. With the following steps as well, the computer 101 may first execute any of updating of the screen and notification of the estimated value in the event of having received the screen information and time information.

On the other hand, the user 103 gives input to the computer 101 via an input device at timing independently from updating of the screen of the computer 101. For example, in step S104, the user 103 performs an input operation. In response to this, in step S105 the computer 101 notifies the contents of the input operation to the computer 102. The computer 102 performs appropriate processing according to the notified input at the process to execute the program.

Also, the computer 102 attempts to transmit the screen information to the computer 101 at the frequency according to the value notified in step S103. Specifically, after elapse of certain time A1 since transmission in step S101, in step S106 the computer 102 generates an image to be displayed on the screen of the computer 101, generates screen information based on the image, and transmits the screen information and time information.

In response to this, in step S107 the computer 101 updates the screen according to the screen information. Also, in step S108, the computer 101 increases, maintains, or decreases the estimated value for available bandwidth. The computer 101 then notifies the estimated value for available bandwidth to the computer 102.

Also, in step S109, the user 103 performs some sort of input operation. In response to this, in step S110 the computer 101 notifies the contents of the input operation to the computer 102. The computer 102 performs appropriate processing according to the notified input at the process to execute the program.

The computer 102 attempts to transmit the screen information to the computer 101 at the frequency according to the value notified in step S108. Specifically, after elapse of certain time A2 since transmission in step S106, in step S111 the computer 102 generates an image to be displayed on the screen of the computer 101, generates screen information based on the image, and transmits the screen information and time information.

In response to this, in step S112 the computer 101 updates the screen according to the screen information. Also, in step S113, the computer 101 increases, maintains, or decreases the estimated value for available bandwidth.

For example, in the event that the network condition has been deteriorated more than ever, time from transmission to reception of the screen information and time information in step S111 is longer than time that the computer 101 estimates from the estimated value for available bandwidth. Accordingly, in this case, in step S113 the computer 101 may decrease the estimated value for available bandwidth, and may notify the decreased estimated value to the computer 102.

The computer 102 attempts to transmit the screen information to the computer 101 at the frequency according to the value notified in step S113. Specifically, after elapse of certain time A3 since transmission in step S111, in step S114 the computer 102 generates an image to be displayed on the screen of the computer 101, generates screen information based on the image, and transmits the screen information and time information.

For example, as described above, in the event that a smaller value than ever has been notified from the computer 101 in step S113, the computer 102 decreases the frequency for transmitting the screen information. Accordingly, the time A3 is longer than the time A1 and A2.

Upon receiving the screen information and time information transmitted in step S114, in step S115 the computer 101 updates the screen in accordance with the screen information. Also, in step S116 the computer 101 increases, maintains, or decreases the estimated value for available bandwidth. The computer 101 then notifies the estimated value for available bandwidth to the computer 102.

Incidentally, let us say that after elapse of a little while since transmission in step S116, the network condition takes a change for the better. In step S117, the computer 102 transmits the screen information and time information, but time involved in this transmission is quit for short time as a result of improvement of the network condition. For example, for convenience of description, let us say that the screen information and time information arrived at the computer 101 with shorter time than time estimated from the estimated value for available bandwidth, and as a result thereof, the computer 101 increases the estimated value.

Specifically, in step S118 the computer 101 updates the screen in accordance with the screen information, and notifies the estimated value improved in step S119 as described above to the computer 102.

Also, the user 103 may perform an input operation at desired timing, and accordingly, in step S120 as well, input is given to the computer 101 from the user 103 via the input device, for example. In response to this, in step S121 the computer 101 notifies the contents of the input operation to the computer 102. The computer 102 performs appropriate processing according to the notified input at the process to execute the program.

The computer 102 attempts to transmit the screen information to the computer 101 at the frequency according to the value notified in step S119. Specifically, after elapse of certain time A4 since transmission in step S117, in step S122 the computer 102 generates an image to be displayed on the screen of the computer 101, generates screen information based on the image, and transmits the screen information and time information.

For example, as described above, in the event that in step S119 the computer 101 has notified to the computer 102 the value greater than the value that the computer 101 notified to the computer 102 during the poor network condition, the computer 102 increases the frequency for transmitting the screen information. Accordingly, the time A4 is shorter than the time A3.

Upon receiving the screen information and time information transmitted in step S122, in step S123 the computer 101 updates the screen in accordance with the screen information. Also, in step S124, the computer 101 increases, maintains, or decreases the estimated value for available bandwidth. The computer 101 then notifies the estimated value for available bandwidth to the computer 102.

For example, as with the above-exemplified steps S101 to S124, the frequency for transmitting the screen information is adjusted according to the network condition. Accordingly, even if the network condition were deteriorated, deterioration in usability due to accumulation of delay is avoided. Also, the image quality at each moment is maintained, and accordingly, deterioration in usability due to deterioration in the image quality is not caused.

Incidentally, in FIG. 1, steps to notify the estimated value for available bandwidth from the computer 101 to the computer 102 are indicated with a dashed line arrow, and steps other than those are indicated with a solid line arrow. As apparent from the above description, though steps indicated with a dashed line arrow are communication that additionally occurs for adjustment of the frequency for transmitting the screen information, data size of the estimated value for available bandwidth is very small. Also, though the time information is transmitted from the computer 102 to the computer 101 to adjust the frequency for transmitting the screen information, data size of the time information is very small.

Accordingly, the first embodiment also has an advantage wherein the volume of communication traffic that additionally occurs to recognize the network condition is quit for very small volume to the extent of not affecting the network condition. In other words, the first embodiment has an advantage wherein the network condition may be estimated without applying additional load to the network, and the volume of communication traffic may be adjusted according to the estimated network condition.

The first embodiment having various advantages as described above is suitable for a thin client system. Hereinafter, supplementary description will be made regarding application of the first embodiment to a thin client system.

With a thin client system, a client is connected to the server via a network. Therefore, operation response performance at a client depends on network conditions. In other words, usability depends on network conditions. However, the network condition is not typically good.

According to the first embodiment, with a method for reducing deterioration in usability even if the network condition were poor, updating of the screen of a client is controlled. This is because the frequency for transmitting the screen information is adjusted according to the network condition, load that additionally occurs in the network to realize the network condition is a somewhat ignorable level, and deterioration in the image quality for each moment is not caused.

Also, it is predicted that as usage of thin client systems is extended, types of work to be performed by a user using a thin client are diversified into various kinds. Accordingly, it is desirable that updating of the screen of a thin client is controlled so that a user may comfortably advance work using the thin client regardless of types of work.

For example, a user may want to perform work using an application that handles high-definition images (still images, moving images, or both thereof) on a thin client, not just creating text documents and exchanging email. Examples of applications that handle high-definition images include a CAD (Computer Aided Design) application, and a photo retouch application.

High-definition images have a great data size, and accordingly, with some types of remote control methods, operation response performance from which practical satisfaction is obtained is often not achieved. Specifically, there are many cases where available bandwidth between a client and the server is insufficient for transmitting data of a high-definition image from the server to the client within short time from which practical satisfaction is obtained.

However, with the first embodiment, even when an application that handles high-definition images, deterioration in usability is relatively slight. This is because, according to the first embodiment, even when the data size of the screen information is great, deterioration in operation response performance due to accumulation of delay may be suppressed by transmitting the screen information with frequency according to the network condition, and moreover, image quality at each time point is maintained.

Note that the frequency for transmitting the screen information is, in other words, frequency for updating the screen of a client that a user is viewing. When this frequency decreases, usability may slightly deteriorate. This is because, in the event that the frequency for updating the screen is low, motions of moving images may appear jerky.

However, as compared to adverse effects that deterioration in operation response performance due to accumulation of delay, or deterioration in image quality at each moment gives to usability, adverse effects that deterioration in frequency for updating the screen gives to usability are small. Accordingly, the first embodiment excels in that deterioration in usability is suppressed or eased.

Also, even if a user did not employ an application that handles high-definition images, in the event that available bandwidth between a client and the server is narrow, with a certain type of remote control method, operation response performance from which practical satisfaction is obtained may not be achieved in a higher rate. As for a user who employs a personal digital assistant such as a smartphone, tablet terminal, notebook personal computer, or the like under a mobile environment, available bandwidth is not sufficiently wide. For example, as compared to an environment where a client and the server are connected with a cable LAN (Local Area Network) within an office, with an environment where a client is connected to the server via a public wireless LAN, available bandwidth is fairly narrow.

However, according to the first embodiment, in the event that available bandwidth is narrow, the frequency for transmitting the screen information is adjusted to a small value according to narrow available bandwidth. As a result thereof, accumulation of delay is avoided. Thus, according to the first embodiment, practically problem-free operation response performance is obtained even under a mobile environment.

As described above, the first embodiment is also suitable for thin client systems of which spread of usage from now on is expected.

Next, advantages of the first embodiment will be described with reference to FIGS. 3 and 4.

Figure 3:
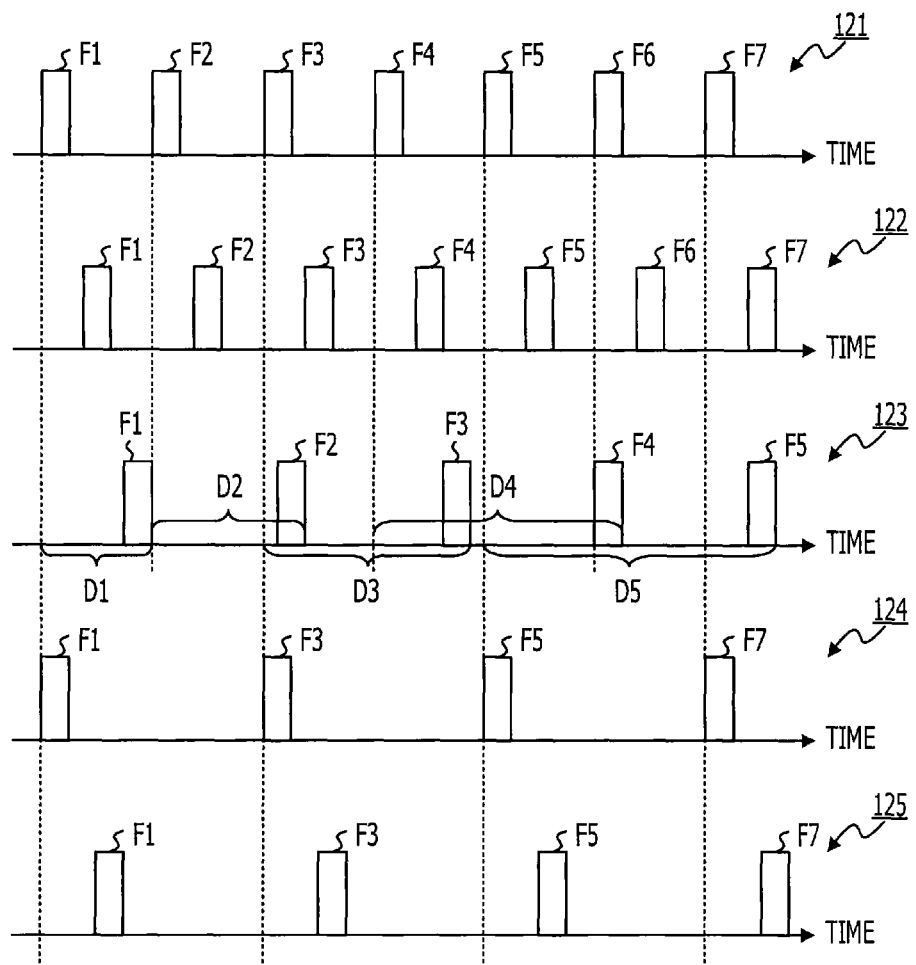
FIG. 3 is a first diagram for describing an advantage of the first embodiment.

FIG. 3 illustrates five schematic timing charts 121 to 125. The timing chart 121 illustrates timing when the computer 102 transmits screen information F1 to F7. For convenience of description, FIG. 3 illustrates the timing chart 121 in the event that the computer 102 transmits the screen information F1 to F7 with certain frequency.

In the event that the actual available bandwidth between the computers 101 and 102 is sufficient, the screen information F1 to F7 is transmitted to the computer 101 as illustrated in the timing chart 122. That is to say, though somewhat delay occurs from transmission to reception (more specifically, from start of transmission to completion of reception), there is not caused a situation in which delay time is gradually prolonged due to accumulation of delay. Accordingly, somewhat satisfactory operation response performance is obtained. Reception frequency illustrated in the timing chart 122 is, in other words, a display frame rate at the computer 101.

On the other hand, the timing chart 123 illustrates, with a comparative example to be compared with the first embodiment, timing when the computer 101 receives the screen information F1 to F5 in the event that the actual available bandwidth between the computers 101 and 102 is insufficient. With the comparative example, let us say that the computer 102 does not adjust frequency for the computer 102 transmitting the screen information F1 to F7. That is to say, with the comparative example, let us say that the computer 102 transmits the screen information F1 to F5 with the same frequency as with the timing chart 121 even when the actual available bandwidth between the computers 101 and 102 is insufficient.

In the event that available bandwidth is insufficient, for example, with a node on a route from the computer 102 to the computer 101, the screen information F1 may be accumulated to wait for link on this route being released. Specifically, the screen information F1 may be accumulated for a while at a transmission buffer with the computer 102, or a buffer within a router on the route, or the like. Similarly, the screen information F2 to F5 may also be accumulated at anywhere on the route from the computer 102 to the computer 101.

In this manner, with the comparative example, when available bandwidth is insufficient, in the event that the computer 102 transmits the screen information F1 to F5 at the frequency in the timing chart 121, the computer 101 receives the screen information F1 to F5 as illustrated in the timing chart 123. As apparent from comparison between the timing charts 121 and 123, reception intervals of the screen information F1 to F5 are longer than transmission intervals of the screen information F1 to F5 as results of accumulation.

When the reception intervals are longer, response performance is gradually deteriorated due to accumulation of delay, and is sensed by a user as if progress in time became late. That is to say, delay time D1 to D5 in the following (11a) to (11e) have a relation of D1<D2<D3<D4<D5.

(11a) Delay time D1 involved from transmission to reception of the screen information F1

(11b) Delay time D2 involved from transmission to reception of the screen information F2

(11c) Delay time D3 involved from transmission to reception of the screen information F3

(11d) Delay time D4 involved from transmission to reception of the screen information F4

(11e) Delay time D5 involved in transmission to reception of the screen information F5

Note that the delay time D1 is more specifically time involved in since transmission of the screen information F1 was started until reception of the screen information F1 is completed. The other delay time D2 to D5 is also the same.

In the event that the computer 101 receives the screen information F1 to F5 as illustrated in the timing chart 123, this is sensed by the user 103 as if progress in time became late. For example, there may be caused a situation in which upon the user 103 performing a mouse operation over one second, a mouse pointer on the screen moves according to this mouse operation over 1.5 seconds. That is to say, the comparative example may cause the user 103 to sense uncomfortable feeling of progress in time differing between input and display.

Further, delay time is gradually prolonged as described above, and accordingly, for example, there may also be caused a situation in which after ten seconds or more since an input operation was performed, the screen is finally changed according to this input operation. That is to say, accumulation of delay may adversely affect operation response capabilities.

As described above, the comparative example as illustrated in the timing chart 123 may significantly deteriorate usability. However, with the first embodiment, the screen information and the transmission frequency of screen information is adjusted, which differs from the comparative example.

For example, according to the estimated value for available bandwidth that the computer 101 notifies to the computer 102, the computer 102 may transmit the screen information at a half of the frequency illustrated in the timing chart 121. The timing chart 124 illustrates a case where the computer 102 thus performs adjustment for reducing the frequency to a half thereof with the first embodiment.

As apparent from comparison between the timing charts 121 and 124, with the example in the timing chart 124, the screen information F2, F4 and F6 is not transmitted. With the example in the timing chart 124, the computer 102 decreases the frequency for transmitting the screen information, and accordingly decreasing the volume of communication traffic per unit time.

As a result thereof, accumulation of delay is avoided. Specifically, as illustrated in the timing chart 125, the computer 101 may receives the screen information F1, F3, F5, and F7. That is to say, though somewhat delay occurs since transmission of each piece the screen information until reception thereof, prolongation of delay due to accumulation of delay is avoided. Accordingly, somewhat satisfactory operation response performance is obtained.

Also, the image quality at each time point that each of the screen information F1, F3, F5, and F7 indicates is not deteriorated with the first embodiment. Accordingly, even a high-definition image and fine characters are clearly displayed on the screen of the computer 101.

Figure 4A:
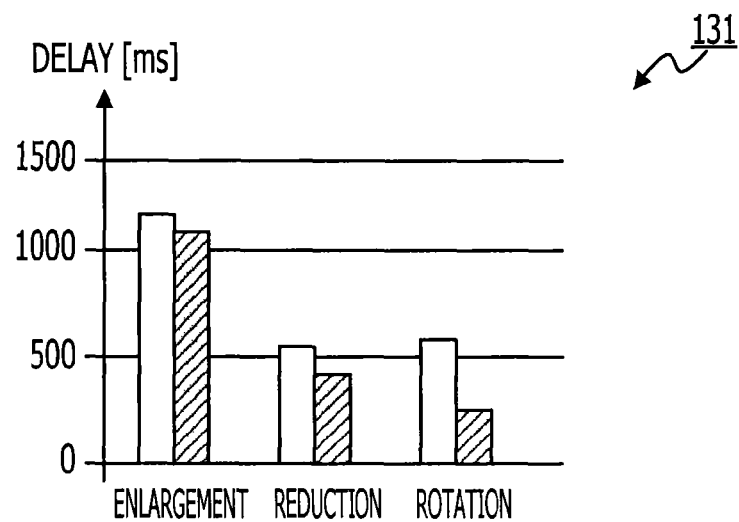
FIG. 4A and FIG. 4B are second diagram for describing an advantage of the first embodiment.
Figure 4B:
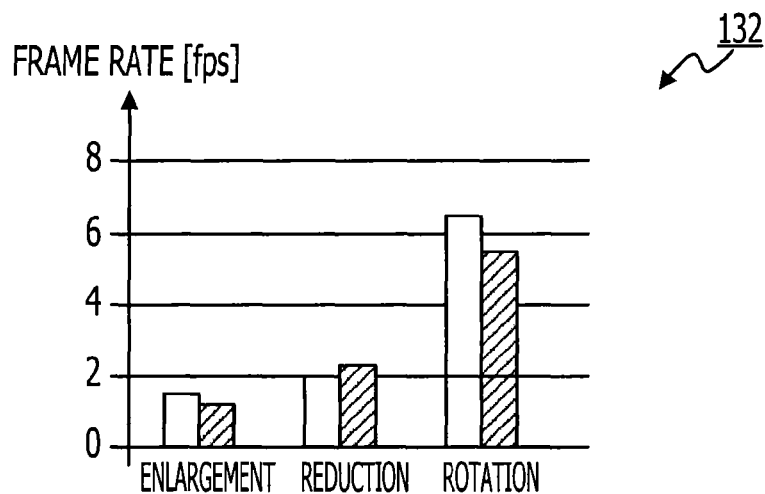

Next, advantages of the first embodiment will further be described with reference to FIG. 4A and FIG. 4B. FIG. 4A and FIG. 4B illustrate a graph 131 regarding delay time and a graph 132 regarding frame rates in the event of a certain CAD application being employed. With the graphs 131 and 132, a white bar graph illustrates a comparative example wherein the computer 102 does not adjust the frequency for transmitting the screen information, and a bar graph with a shaded pattern illustrates the first embodiment.

Specifically, with regard to FIG. 4A and FIG. 4B, the comparative example and the first embodiment are common in the following points (12a) through (12c).

(12a) The user 103 performs an input operation to activate the CAD application, and an input operation for enlargement, reduction, rotation, or the like on the CAD application.

(12b) The computer 102 executes, according to the contents of the input operation notified from the computer 101, the CAD application, and generates an image to be displayed on the screen of the computer 101. The computer 102 then generates screen information to display the generated image on the computer 101, and transmits the screen information to the computer 101.

(12c) The computer 101 updates the screen in accordance with the received screen information.

However, with the comparative example, the following processing in (13a) to (13c) is not performed, but on the other hand, with the first embodiment, the following processing in (13a) to (13c) is performed.

(13a) The computer 102 transmits both of the screen information and time information to the computer 101.

(13b) The computer 101 decides whether to increase, maintain, or decrease the estimated value for available bandwidth using the time information. The computer 101 notifies the estimated value for available bandwidth (or index value to reflect updating of the estimated value) to the computer 102.

(13c) The computer 102 adjusts the frequency for transmitting the screen information according to the notified value.

Specifically, the graph 131 illustrates average delay time when the user 103 performs each of the input operations multiple number of times for each type of input operations such as enlargement, reduction, and rotation. Note that the delay time in the graph 131 is time since a time point when the user 103 performed an input operation until the image according to this input operation is displayed on the screen of the computer 101. As apparent from comparison between a white bar graph and a bar graph with a shaded pattern, the first embodiment is shorter than the comparative example regarding delay time. Accordingly, the first embodiment is effective for improvement in usability.

Also, the graph 132 illustrates an average display frame rate when the user 103 performs each of the input operations multiple number of times for each type of input operations such as enlargement, reduction, and rotation. A display frame rate in the comparative example that a white bar graph indicates is, as exemplified in the timing chart 123 in FIG. 3 for example, a display frame rate lower than a transmission frame rate serving as results of accumulation of delay. On the other hand, a display frame rate according to the first embodiment that a bar graph with a shaded pattern indicates is a lowered frame rate serving as a result for the computer 102 adjusting the frequency for transmitting the screen information according to a value notified from the computer 101.

With the graph 132, there is no frame rate difference between the comparative example and the first embodiment not much. This indicates that adjustment (i.e., adjustment based on estimation of available bandwidth) of the frequency for transmitting the screen information (in other words, transmission frame rate) is suitable, and the actual available bandwidth is sufficiently utilized. That is to say, according to the first embodiment, a frame rate is also suppressed from being excessively lowered (as a result thereof, display of the screen is excessively jerky).

Figure 5:
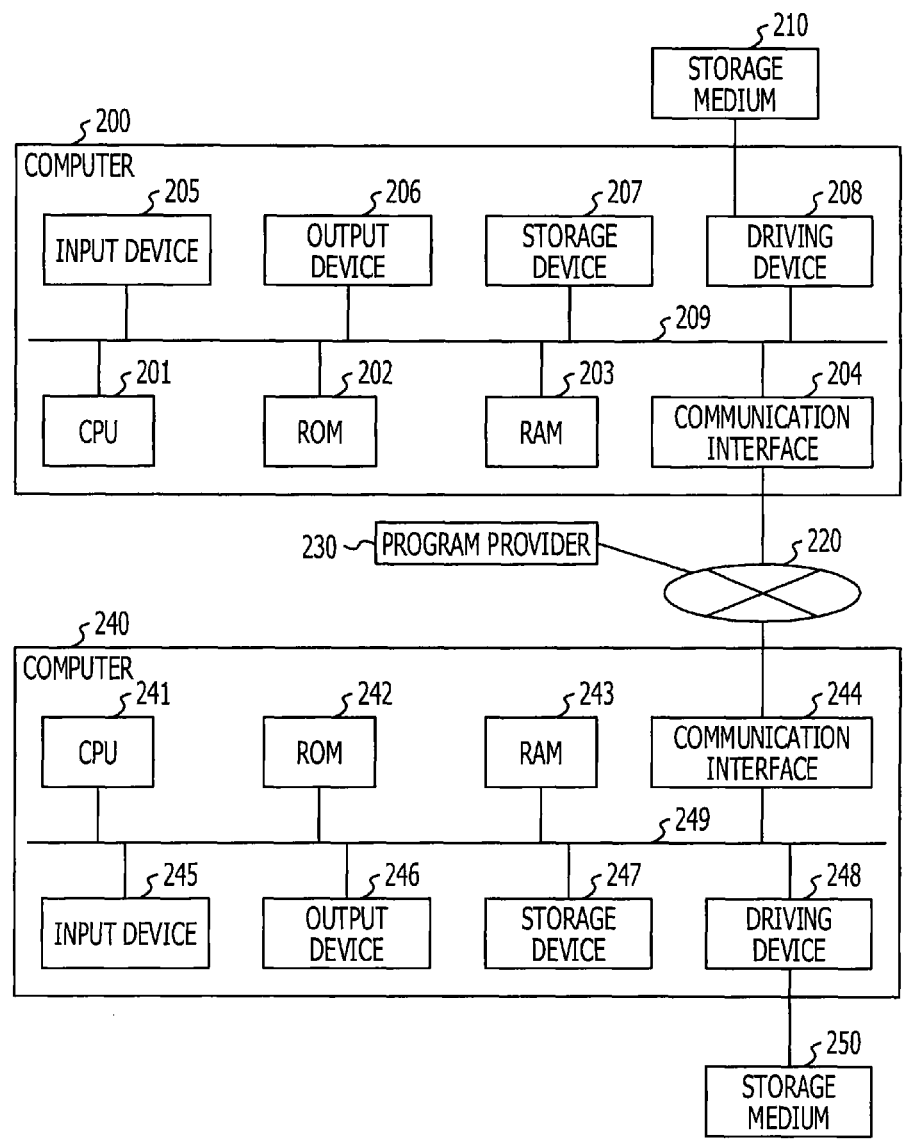
FIG. 5 is a diagram illustrating a hardware configuration example.

FIG. 5 is a diagram illustrating a hardware configuration example. The hardware configuration illustrated in FIG. 5 may be applied to any of the first to fourth embodiments. FIG. 5 exemplifies computers 200 and 240 mutually connected via a network 220.

For example, with regard to the first embodiment, the computer 101 illustrated in FIG. 1 may be the computer 200 in FIG. 5. In this case, the computer 102 in FIG. 1 may be the computer 240 in FIG. 5.

Also, with regard to the second to fourth embodiments, a later-described server 310 in FIG. 6 may be the computer 240 in FIG. 5. In this case, a client 320 in FIG. 6 may be the computer 200 in FIG. 5.

The computers 200 and 240 may be any type. For example, the computer 200 may be a user terminal which an end user uses. Also, the computer 240 may be a server which provides a remote desktop service serving as a type of a cloud service. Examples of the user terminal includes a desktop personal computer, a notebook personal computer, a tablet terminal, a PDA (Personal Digital Assistant), a smartphone, and a media player having a network function.

The network 220 may be any type. The network 220 may be any of a LAN, a WAN (Wide Area Network), the Internet, or a combination thereof, for example. Also, the network 220 may be a cable network, a wireless network, or a combination of both.

The computer 200 in FIG. 5 includes a CPU (Central Processing Unit) 201, ROM (Read Only Memory) 202, RAM (Random Access Memory) 203, and a communication interface 204. The computer 200 further includes an input device 205, an output device 206, a storage device 207, and a driving device 208 of a computer-readable storage medium 210. The components of the computer 200 are mutually connected by a bus 209.

The CPU 201 is a single-core or multi-core processor. The computer 200 may include multiple processors. For example, the computer 200 may include two or more CPUs 201, and a processor such as a GPU (Graphics Processing Unit) in addition to the CPU 201. The CPU 201 loads a program to the RAM 203, and executes the program using the RAM 203 as a working area.

The communication interface 204 is, for example, a cable LAN interface, a wireless LAN interface, or a combination thereof. The computer 200 is connected to the network 220 via the communication interface 204.

The communication interface 204 may be, specifically, an external NIC (Network Interface Card), or an on-board network interface controller. For example, the communication interface 204 may include a circuit called a PHY chip which performs processing for a physical layer, and a circuit called a "MAC chip" which performs processing for a "MAC" (Media Access Control) sub layer.

The input device 205 is, for example, a keyboard, a pointing device, or a combination thereof. The pointing device may be, for example, a mouse, a touch pad, or a touch screen. The output device 206 is a display, a speaker, or a combination thereof. The display may be a touch screen.

The storage device 207 is, for example, a nonvolatile storage device such as an HDD (Hard Disk Drive) or SSD (Solid-State Drive) or the like.

Examples of the storage medium 210 include an optical disc such as CD (Compact Disc), DVD (Digital Versatile Disc) or the like, a magneto-optical disc, a magnetic disk, and a semiconductor memory card such as flash memory or the like.

A program that the CPU 201 executes may be installed into the ROM 202 or storage device 207 beforehand. Alternatively, the program may be provided by being stored in the storage medium 210, read from the storage medium 210 by the driving device 208, copied to the storage device 207, and then loaded to the RAM 203. Alternatively, a program may be downloaded to the computer 200 from a program provider 230 on the network 220 via the network 220 and communication interface 204, and installed. The program provider 230 is specifically another computer different from the computers 200 and 240.

The computer 240 includes a CPU 241, ROM 242, RAM 243, a communication interface 244, an input device 245, an output device 246, a storage device 247, and a driving device 248 of a computer-readable storage medium 250. The components of the computer 240 are mutually connected by a bus 249. The configuration of the computer 240 is similar to the configuration of the computer 200, and accordingly, detailed description will be omitted, but some points to be supplemented are as follows.

In FIG. 5, the single CPU 241 alone is illustrated, but the computer 240 may include multiple processors in the same way as with the computer 200. The computer 240 may further include a dedicated hardware circuit for compression of moving images in addition to the CPU 241.

The program that the CPU 241 executes may be installed into the ROM 242 or storage device 247 beforehand. Alternatively, the program may be provided by being stored in the storage medium 250, read from the storage medium 250 by the driving device 248, copied to the storage device 247. Alternatively, a program may be downloaded to the computer 240 from the program provider 230 via the network 220 and communication interface 244, and installed.

Note that any of the ROM 202, RAM 203, storage device 207, storage medium 210, ROM 242, RAM 243, storage device 247, and storage medium 250 is a tangible storage medium, and is not a transitory medium such as signal carriers.

Next, a second embodiment will be described with reference to FIGS. 6 to 12. As will be described later in detail, FIGS. 6 to 8 and 10 to 12 also relate to third and fourth embodiments. With any of the second to fourth embodiments as well, the same advantages as with the first embodiment will be obtained.

Figure 6:
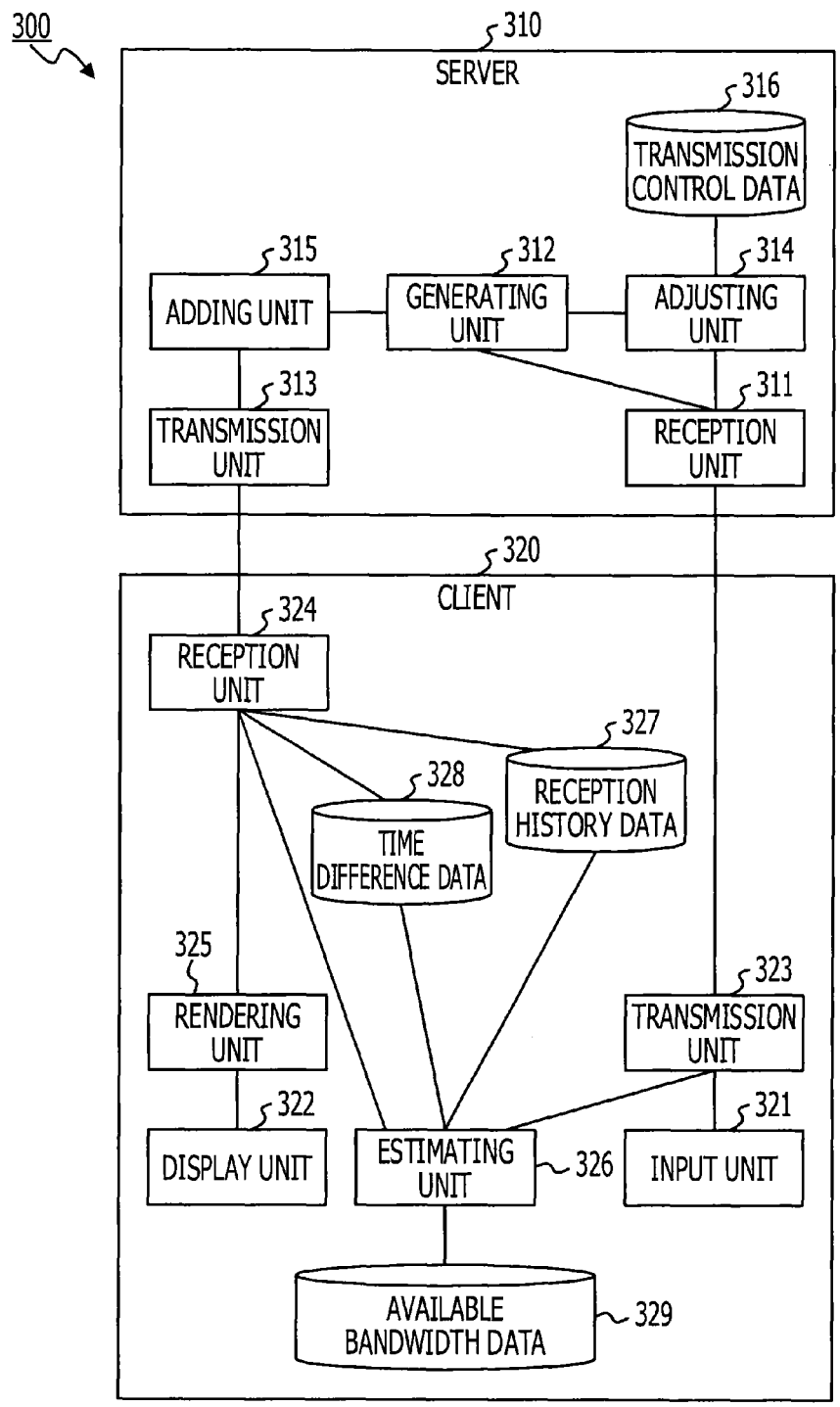
FIG. 6 is a block configuration diagram of a system.

FIG. 6 is a block configuration diagram of a system. A system 300 in FIG. 6 includes a server 310 and a client 320. As described above, the server 310 may be the computer 240 in FIG. 5, and the client 320 may be the computer 200 in FIG. 5, for example. In FIG. 6, a network is omitted, but as exemplified in FIG. 5, the server 310 and client 320 are connected via a network.

The server 310 includes a reception unit 311, a generating unit 312, a transmission unit 313, an adjusting unit 314, and an adding unit 315. Also, the server 310 holds transmission control data 316.

The reception unit 311 receives data from the client 320. There are at least two types of data to be transmitted from the client 320 to the server 310.

The first type data is data for notifying input from a user to the client 320, to the server 310. Upon receiving the first type data, the reception unit 311 outputs the received data to the generating unit 312.

The second type data is data for notifying available bandwidth and excessive delay time to the server 310 as will be described later. The excessive delay time indicates how much the actual reception time is delayed than reception time estimated from the available bandwidth. Upon receiving the second type data, the reception unit 311 outputs the received data to the adjusting unit 314.

The generating unit 312 generates an image to be displayed on the screen of the client 320. Specifically, the generating unit 312 executes one or multiple programs based on input notification to the client 320 (i.e., the first type data), and generates an image according to execution of the program. The generating unit 312 then generates, based on the generated image, screen information to cause the client 320 to display the image on the screen (specifically, later-described rendering command). The transmission unit 313 transmits the screen information to the client 320.

More specifically, frequency for the screen information being transmitted to the client 320 is adjusted by the adjusting unit 314. In other words, the adjusting unit 314 controls frequency for the generating unit 312 outputting the screen information. The adjusting unit 314 performs adjustment of the frequency using the transmission control data 316. A specific example of the transmission control data 316 will be described later along with FIG. 7A.

Also, when the screen information is transmitted to the client 320, time information that indicates the current time is added to the screen information by the adding unit 315, and the screen information is transmitted from the transmission unit 313 along with the time information. That is to say, the screen information is transmitted along with time information that indicates time when the screen information is transmitted.

Note that, in the event that the server 310 is realized by the computer 240 in FIG. 5, the reception unit 311 may be realized by the CPU 241 and communication interface 244. Similarly, the transmission unit 313 may also be realized by the CPU 241 and communication interface 244. Any of the generating unit 312, adjusting unit 314, and adding unit 315 may be realized by the CPU 241. It is desirable that the transmission control data 316 is stored in the RAM 243, but the transmission control data 316 may be stored in the storage device 247.

On the other hand, the client 320 includes an input unit 321, a display unit 322, a transmission unit 323, a reception unit 324, a rendering unit 325, and an estimating unit 326. Also, the client 320 holds reception history data 327, time difference data 328, and available bandwidth data 329.

The input unit 321 accepts input from the user. The input unit 321 may be the input device 205 in FIG. 5, for example.

The display unit 322 displays the screen. The display unit 322 may be the output device 206 in FIG. 5, for example.

The transmission unit 323 transmits data for notifying input given from the user to the client via the input unit 321, to the server 310, or data for notifying the available bandwidth and excessive delay time to the server 310, to the server 310. The transmission unit 323 may be realized by the CPU 201 and communication interface 204 in FIG. 5, for example.

The reception unit 324 receives the screen information from the server 310 along with the time information. Also, as will be described later in detail, the server 310 transmits time that a clock of the client 320 indicates, and data for calculating time difference with time that a clock of the server 310 indicates (hereinafter, for convenience of description, also referred to as "time adjusting command"). Accordingly, the reception unit 324 also receives not only the screen information but also the time adjusting command.

The reception unit 324 updates the reception history data 327 each time the reception unit 324 receives data from the server 310. Also, upon receiving the time adjusting command, the reception unit 324 calculates time difference between time that the clock of the client 320 indicates and time that the clock of the server 310 indicates, and stores the calculation result as time difference data 328.

Figure 7A:
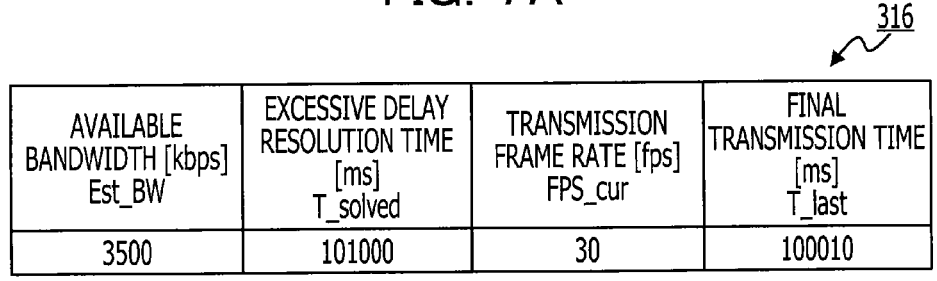
FIGS. 7A to 7E are diagrams illustrating an example of various types of data.
Figure 7B:
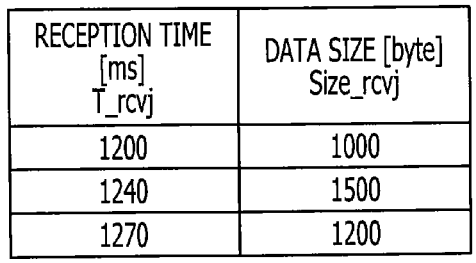
Figure 7C:
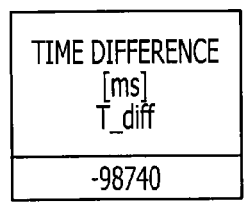

Specific examples of the reception history data 327 and time difference data 328 will be described later along with FIG. 7B and FIG. 7C. Note that, in the event that the client 320 is realized by the computer 200 in FIG. 5, it is desirable that the reception history data 327 and time difference data 328 are stored in the RAM 203, but the reception history data 327 and time difference data 328 may be stored in the storage device 207. Note that, as with the transmission unit 323, the reception unit 324 may also be realized by the CPU 201 and communication interface 204.

The rendering unit 325 renders a part or all of the screen based on the screen information received by the reception unit 324. The rendering unit 325 may be realized by the CPU 201 (or another processor such as a GPU not illustrated).

The estimating unit 326 estimates available bandwidth of the network between the server 310 and the client 320 using the reception history data 327 and time difference data 328. The estimated value for available bandwidth is stored as available bandwidth data 329. A specific example of the available bandwidth data 329 will be described later along with FIG. 7D and FIG. 7E.

More specifically, at the time of estimation of available bandwidth, the estimating unit 326 calculates excessive delay time. The excessive delay time is difference between time when the reception unit 324 actually received the screen information and reception time estimated from the current available bandwidth 329. The estimating unit 326 increases, maintains, or decreases the estimated value for available bandwidth according to the excessive delay time.

Also, the estimating unit 326 outputs the available bandwidth and excessive delay time to the transmission unit 323. In response to this, the transmission unit 323 transmits data for notifying the available bandwidth and excessive delay time to the server 310 (the above-mentioned second type data), to the server 310.

Note that the estimating unit 326 may be realized by the CPU 201 in FIG. 5. Also, it is desirable that the available bandwidth data 329 is stored in the RAM 203, but the available bandwidth 329 may be stored in the storage device 207.

Next, details of various types of data in FIG. 6 will be described with reference to FIGS. 7A to 7E. In FIGS. 7A to 7E, for convenience of reference, symbols to be used in later-described expressions will be described together.

Now, for sake of convenience, we will hereinafter say that the time at the server 310 will be represented by the amount of time that has elapsed since the server 310 has started up. In the same way, we will hereinafter say that the time at the client 320 will be represented by the amount of time that has elapsed since the client 320 has started up. Accordingly, in FIGS. 7A to 7E, the time is indicated in increments of ms (milliseconds).

The time at the server 310 may be counted by a timer housed in the CPU 241 of the computer 240 which realizes the server 310, for example. Similarly, the time at the client 320 may be counted by a timer housed in the CPU 201 of the computer 200 which realizes the client 320, for example.

The transmission control data 316 held at the server 310 specifically includes the available bandwidth, excessive delay resolution time, transmission frame rate, and final transmission time. With the example in FIGS. 7A to 7E, the available bandwidth is 3500 kbps (kilobit per second), the excessive delay resolution time is 101000 ms, the transmission frame rate is 30 fps, and the final transmission time is 100010 ms.

Available bandwidth within the transmission control data 316 indicates an estimated value notified from the client 320. The initial value of the available bandwidth is an invalid value, for example, such as 0 kbps.

Also, the excessive delay resolution time is time that indicates a guide to regarding "how long the server 310 preferably refrains from transmission of the screen information in order to resolve excessive delay". As will be described later, the excessive delay resolution time is calculated based on excessive delay time to be notified from the client 320. The initial value of the excessive delay resolution time is an invalid value, for example, such as 0 ms.

The transmission frame rate indicates the current value of the frequency for transmitting the screen information. The initial value of the transmission frame rate is a predetermined value, for example, such as 30 fps. The initial value of the transmission frame rate may be an appropriate value according to an embodiment.

The final transmission time is time when the server 310 finally transmitted the screen information to the client 320. The initial value of the final transmission time is an invalid value, for example, such as 0 ms.

The reception history data 327 held at the client 320 may include one or more entries. Each of the entries is a pair of reception time and size of data that the reception unit 324 received at this reception time. The example in FIGS. 7A to 7E illustrates that the reception unit 324 received data of 1000 bytes at the time of 1200 ms, and received data of 1500 bytes at the time of 1240 ms, and received data of 1200 bytes at the time of 1270 ms.

The reception history data 327 has no entry in the initial state. Also, an entry of which the reception time is older than a predetermined range from the current time is deleted by the reception unit 324. Hereinafter, for convenience of description, let us say that the above-mentioned predetermined range is taken as a range of within six seconds from the present, but the predetermined range may be decided according to an embodiment as appropriate.

Also, the time difference 328 held at the client 320 indicates time difference between time that the clock of the client 320 indicates and time that the clock of the server 310 indicates. With the second to fourth embodiments, specifically, an approximate value of the time difference will be employed. With the example in FIGS. 7A to 7E, the time difference is −98740 ms.

Figure 7D:
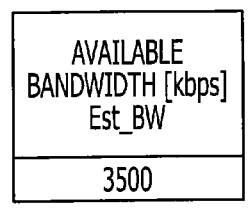

Incidentally, the available bandwidth data 329 in FIG. 6 held at the client 320 is, with the second and third embodiments, specifically, as with the available bandwidth data 329a in FIG. 7D, data including the estimated value for available bandwidth estimated by the estimating unit 326. With the example in FIG. 7D, the available bandwidth 329a includes an estimated value of 3500 kbps.

On the other hand, with a later-described fourth embodiment, the available bandwidth data 329 in FIG. 6 specifically includes, as with the available bandwidth 329b in FIG. 7E, not only the estimated value for available bandwidth estimated by the estimating unit 326 but also the last notified bandwidth. With example in FIG. 7E, the available bandwidth is 3500 bps, and the last notified bandwidth is 3850 bps. Details of the last notified bandwidth will be described later along with the fourth embodiment.

Figure 9:
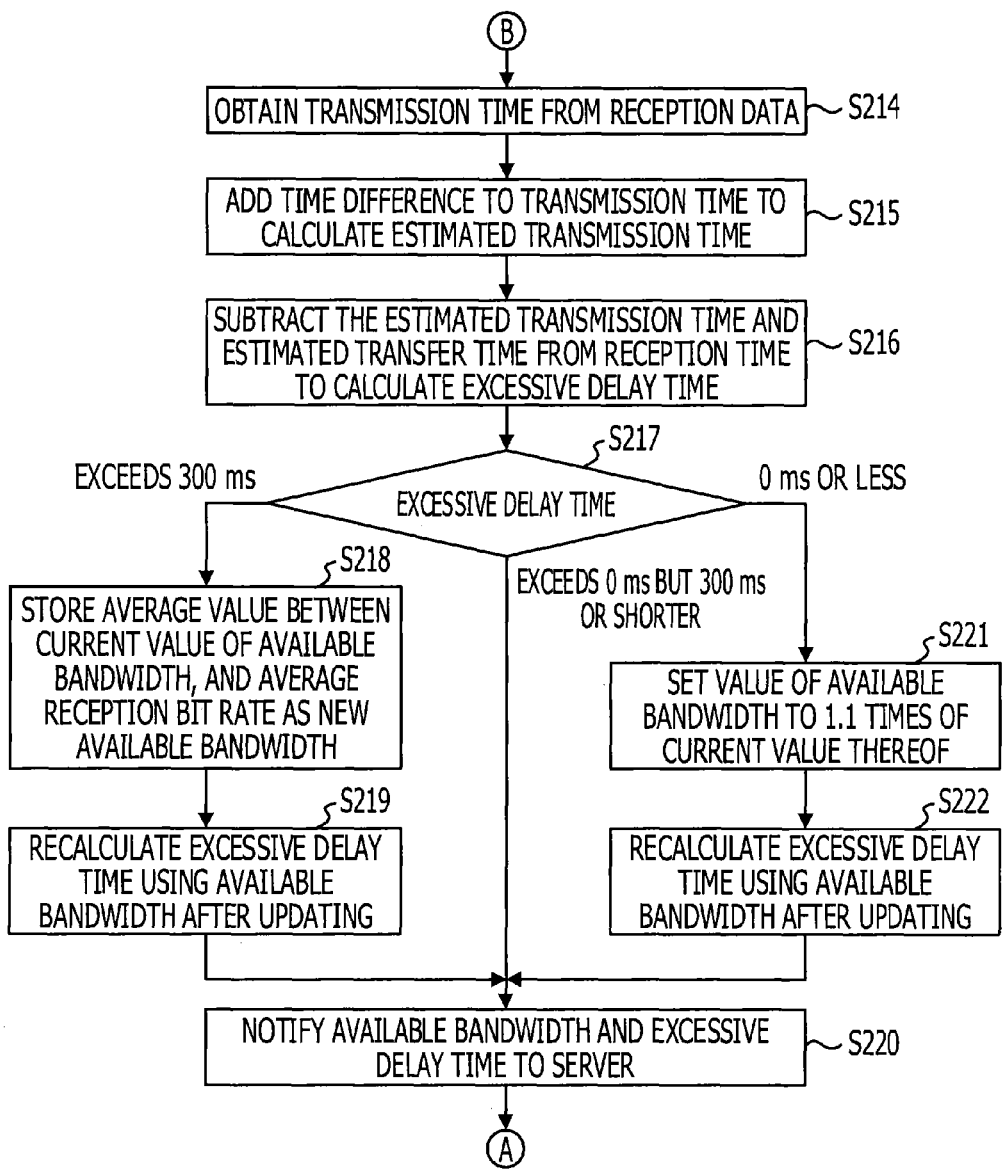
FIG. 9 is a second client operation flowchart according to the second embodiment.

FIGS. 8 and 9 are operation flowcharts of the client 320 according to the second embodiment. Upon the client 320 being activated by power-on, the client 320 starts processing in FIGS. 8 and 9.

In step S201, the client 320 transmits a connection request to the server 310 to establish connection with the server 310, and performs remote desktop initialization processing. The remote desktop initialization processing is initialization processing for the client 320 receiving a remote desktop service from the server 310. For example, in step S201, the client 320 may notify information such as resolution of the display unit 322 or an input method to be employed, or the like to the server 310.

Next, in step S202 the client 320 waits for occurrence of an event.

Upon an input event occurring such as input being given from the user via the input unit 321, the processing proceeds to step S203. A specific example of the input event is an operation, for example, such as pressing of a key of the keyboard, movement of a mouse pointer, dragging, clicking (or tapping), double clicking (double tapping), flicking, pinch-in, pinch-out, or the like.

On the other hand, upon a data reception event to the effect that the reception unit 324 receives some sort of data from the server 310 occurring, the processing proceeds to step S204.

In step S203, the transmission unit 323 notifies the contents of input given via the input unit 321 to the server 310. The processing then returns to step S202.

In step S204, the reception unit 324 adds a pair of the reception time and the data size to the reception history data 327. Specifically, the reception unit 324 obtains the current time, checks size of data received from the server 310, and adds a new entry made up of a combination between the current time and the checked size to the reception history data 327.

Note that a format of data to be transmitted from the server 310 to the client 320 may be determined as appropriate, depending on the embodiment. For example, in the event that a remote desktop service is provided on TCP/IP (Transmission Control Protocol/Internet Protocol), data to be transmitted from the server 310 to the client 320 may a packet including the following fields in (14a) to (14d).

(14a) IP header
(14b) TCP header
(14c) Header of the application layer for remote desktop service
(14d) Payload of the application layer for remote desktop service For example, in the event that the reception unit 324 have received a packet including the fields in (14a) to (14d), a data size to be recorded in the reception history data 327 is length of the enter packet including the fields in (14a) to (14d).

Next, in step S205 the reception unit 324 decides the type of the received data. For example, the header of the application layer in (14c) may include a field that indicates the type of data. In this case, the reception unit 324 may decide the type of data by referencing the header of the application layer. Hereinafter, for convenience of description, let us say that data to be transmitted from the server 310 to the client 320 has at least two types of "time adjusting command" and "rendering command".

The time adjusting command is data for calculating time difference between time that the clock of the client 320 indicates and time that the clock of the server 310. Specifically, the time adjusting command includes a timestamp that indicates time when the sever 310 transmitted the time adjusting command.

Note that the format of the header of the application layer in (14c) may vary according to embodiments. According to the format of the header in (14c), the timestamp may be included in the header in (14c), or may be included in the payload in (14d).

The rendering command is data including the screen information for the server 310 causing the client 320 to display an image on the screen. As will be described later in detail, the payload of the rendering command includes data obtained by compressing a portion or the entirety of the screen with a still-image format, data obtained by compressing a portion or the entirety of the screen with a moving-image format, or a combination of both. In other words, the rendering command includes the screen information in the third format described in the first embodiment.

For example, as for the format for still images, the JPEG (Joint Photographic Experts Group) format is available, and as for the format for moving images, the MPEG format is available. It goes without saying that another image compression format may be employed according to an embodiment.

Also, the rendering command also includes a timestamp which indicates time when the server 310 transmitted the render command. The timestamp may be included in the header or may be included in the payload according to the format of the header of the application layer.

In the event that the received data is the time adjusting command, the processing proceeds to step S207. In the event that the received data is the rendering command, the processing proceeds to step S210. In the event that the received data is other type of data, the processing proceeds to step S206.

In step S206, the client 320 performs appropriate processing according to the type of the received data. The processing in FIGS. 8 and 9 then proceeds to step S202

In step S207, the reception unit 324 obtains the transmission time of the time adjusting command from the received time adjusting command. The transmission time to be obtained is time represented with the clock at the server 310. Hereinafter, for convenience of description, the transmission time to be obtained in step S207 may be referred to as "T_sent".

Next, in step S208, the reception unit 324 obtains the current time, and calculates difference between the current time and the transmission time obtained in step S207. The reception unit 324 then stores the calculated time difference as the time difference data 328.

The current time obtained in step S208 is time represented with the clock of the client 320. Hereinafter, for convenience of description, the current time obtained in step S208 will be referred to as "T_now_c", and the time difference calculated in step S208 will be referred to as "T_diff". That is to say, the time difference T_diff in Expression (1) is stored as the time difference data 328.

$$T\_diff = T\_now\_c - T\_sent \quad (1)$$

As apparent from Expression (1), the time difference T_diff according to the second embodiment is not a value that strictly indicates difference itself between the time represented by the clock of the client 320 and the time represented by the clock of the server 310, but an approximate value of this time difference. With regard to short data such as the time adjusting command, transfer time since the server 310 began to transmit this data until the client 320 completes reception of this data is also short. Accordingly, difference between the time represented by the clock of the client 320 and the time represented by the clock of the server 310 is approximated as Expression (1) by ignoring the short transfer time.

Note that, for convenience of description, FIGS. 7A to 7E illustrates time in millisecond units, but let us say that the time in Expression (1) and later-described numeric expressions and time units are seconds.

After that reception unit 324 updates the time difference data 328 as described above, the processing returns to step S202.

In step S209, the rendering unit 325 renders an updated area on the screen in accordance with the rendering command received by the reception unit 324.

Specifically, the payload of the rendering command includes data for making the rendering unit 325 render an updated area within the screen. For example, the screen of the display unit 322 may be, as exemplified in FIG. 2, divided into H blocks in the horizontal direction, and divided into V blocks in the vertical direction (2≤H and also 2≤V). In this case, the screen includes the H×V blocks in total. All of these H×V blocks may have change, or any block thereof may not have change, or one or more blocks may have change but the remaining blocks may have no change.

In the event that at least one block has change, the payload of the rendering command includes data obtained by compressing the changed block in the still-image format, or data obtained by compressing a rectangular area including the changed block in the moving-image format, or both thereof. Accordingly, the rendering unit 325 decodes the data included in the payload of the rendering command to render the updated areas on the screen.

For example, with the example in FIG. 2, the payload of the rendering command includes data obtained by compressing the area 111 in the moving-image format, data obtained by compressing the area 112 in the still-image format, and data obtained by compressing the area 113 in the still-image format. Accordingly, the rendering unit 325 decodes the data included in the payload of the rendering command to update the areas 111 to 113. For example, the rendering unit 325 updates data of each pixel within the areas 111 to 113 stored on VRAM (Video Random Access Memory) in accordance with the decoded results. Thus, the rendering unit 325 updates the areas 111 to 113 on the screen.

In the next step S210, the estimating unit 326 calculates an average reception bit rate during a period within the latest six seconds using the reception history data 327. As described regarding FIGS. 7A to 7E, with the second embodiment, after elapse of six seconds since the reception time, the entry is deleted from the reception history data 327. Accordingly, the reception time of any entry in the reception history data 327 is within six seconds from the present.

For convenience of description, let us say that the number of entries in the reception history data 327 is R (1≤R). Also, with regard to each j satisfying 1≤j≤R, the reception time and data size at the j-th entry in the reception history data 327 will be referred to as "T_rcv$_j$" and "Size_rcv$_j$", respectively. Now, let us say that the reception time of the first entry is the oldest, and the reception time of the R-th entry is the latest.

In step S210, the estimating unit 326 may more specifically calculate an average reception bit rate (hereinafter, referred to as "BPS_avr") during a period within the latest six seconds, for example, in accordance with Expression (2).

$$\text{BPS\_avr} = \frac{\sum_{j=1}^{R} 8 \cdot \text{Size\_rcv}_j}{T\_now\_c - T\_rcv_1} \quad (2)$$

Note that multiplication of 8 in Expression (2) indicates conversion from bytes to bits. Also, "T_now_c" in Expression (2) indicates the current time that the estimating unit 326 obtains in step S210. Note that, for convenience of reference, in FIGS. 7A to 7E, bandwidth is indicated in kbps units, but let us say that units of bandwidth and a reception bit rate in Expression (2) and later-described numerical expressions are bps (bit per second).

Depending on the embodiment, the denominator of Expression (2) may be replaced with a constant of "6" in accordance with the length of a predetermined period of the above-mentioned "the latest six seconds". It goes without saying that the length itself of the predetermined period may be changed according to embodiments as appropriate.

Next, in step S211 the estimating unit 326 references the available bandwidth data 329 to determine whether the available bandwidth is the initial value (e.g., 0 kbps). In the event that the available bandwidth is the initial value, the processing proceeds to step S212, and in the event that the available bandwidth is not the initial value, the processing proceeds to step S213.

In step S212, the estimating unit 326 stores the average reception bit rate BPS_avr calculated in step S210 as the available bandwidth. That is to say, the estimating unit 326 overwrites the available bandwidth data 329 with the average reception bit rate BPS_avr.

Note that the available bandwidth data 329 indicates the estimated value for available bandwidth of end-to-end between the server 310 and the client 320. The actual available bandwidth may be changed over time, but an average value of the actual values of available bandwidth during a certain period is estimated to be not less than the average reception bit rate during this period. Accordingly, in step S212, the average reception bit rate BPS_avr is employed as the estimated value for available bandwidth (i.e., the average reception bit rate BPS_avr is stored as the available bandwidth data 329).

Hereinafter, for convenience of description, the available bandwidth (more accurately, the estimated value for available bandwidth) may be referred to as "EstBW". Specifically, for simplification of description, this may also be referred to as "available bandwidth EstBW", or for clearness of distinction between the actual value and estimated value of the available bandwidth, this may also be referred to as "estimated value for available bandwidth EstBW".

The processing in step S212 is represented as Expression (3). As viewed from a certain point of view, the processing in step S212 is processing to initialize the available bandwidth EstBW, set to an invalid value, into a valid value using Expression (3).

$$EstBW = BPS\_avr \quad (3)$$

After the available bandwidth is updated as described above, the processing proceeds to step S213.

In step S213, the estimating unit 326 calculates an estimated value of time involved in transfer of data received this time from the size of data (i.e., rendering command) and available bandwidth that the reception unit 324 received this time. Hereinafter, for convenience of description, the time calculated in step S213 will be referred to as "estimated transfer time", and represented as "EstT_trans".

Specifically, the estimating unit 326 uses the data size Size_rcv$_R$ stored in the latest entry of the reception history data 327, and the available bandwidth Est_BW stored as the available bandwidth data 329 to calculate Expression (4).

$$EstT\_trans = 8 \times Size\_rcv_R / EstBW \quad (4)$$

Next, in the next step S214 in FIG. 9, the estimating unit 326 obtains time information that indicates time when the rendering command was transmitted from the sever 310 (i.e., the above-mentioned timestamp) from the rendering command received by the reception unit 324.

Hereinafter, transmission time that the time information obtained in step S214 indicates will also be represented as "T_sent" for convenience of description. The transmission time T_sent is time represented by the clock of the server 310. The estimating unit 326 obtains the transmission time T_sent as described above.

In the next step S215, as indicated in Expression (5), the estimating unit 326 adds the time difference T_diff to the transmission time T_sent to calculate estimated transmission time (hereinafter, represented as "EstT_sent").

$$EstT\_sent = T\_sent + T\_diff \quad (5)$$

As apparent from Expression (1), the time represented by the clock of the server 310 is converted into the time represented by the clock of the client 320 by adding the time difference T_diff to the time represented by the clock of the server 310. Also, the time difference T_diff is an approximate value as described above. Accordingly, the estimated transmission time EstT_sent calculated by Expression (5) indicates the estimated value of time obtained by indicating the time T_sent when the rendering command was transmitted from the server 310 using the clock of the client 320.

Next, in step S216, as indicated with Expression (6), the estimating unit 326 subtracts the estimated transmission time EstT_sent and estimated transfer time EstT_trans from the reception time T_rcv$_R$ stored in the latest entry of the reception history data 327. The estimating unit 326 calculates excessive delay time by subtraction in Expression (6). Note that, as indicated in Expression (6), hereinafter, the excessive delay time will also be referred to as "ExtraDelay" as appropriate.

$$ExtraDelay = T\_rcv_R - EstT\_sent - EstT\_trans \quad (6)$$

The excessive delay time ExtraDelay indicates how much the actual reception time T_rcv$_R$ is delayed as compared to the reception time (EstT_sent+EstT_trans) estimated from the available bandwidth Est_BW.

In the event that the rendering command has been received prior to the reception time estimated based on the available bandwidth data 329, the excessive delay time ExtraDelay is negative. Conversely, in the event that the rendering command has been received later than the reception time estimated based on the available bandwidth data 329, the excessive delay time ExtraDelay is positive.

Next, in step S217, the estimating unit 326 decides whether the excessive delay time ExtraDelay is longer than 300 ms, longer than 0 ms but 300 ms or shorter, or 0 ms or shorter.

Note that "300 ms" serving as a first threshold in step S217 may be replaced with another positive value according to an embodiment as appropriate. Similarly, "0 ms" serving as a second threshold in step S217 may also be replaced with another positive value according to an embodiment as appropriate.

It is desirable that the second threshold is zero or a negative value, but a smaller positive value approaching zero may be employed as the second threshold. However, in either case, the second threshold is smaller than the first threshold.

Note that the two thresholds may be user-definable variables, or may be a variable threshold that the estimating unit 326 changes according to the available bandwidth EstBW. However, hereinafter, for simplification of description, let us say that the fixed two thresholds will be employed.

The meanings of these two thresholds are as follows. It is desirable that the first and second thresholds are suitably determined based on pilot study or the like so as to sufficiently reflect the meanings that will be described below.

The actual available bandwidth may fluctuate over time. For example, the actual available bandwidth may fluctuate according to the volume of network communication by other computers other than the server 310 and client 320. Also, in the event that at least a portion of the network between the server 310 and the client 320 is a wireless network, the actual available bandwidth may also fluctuate due to some factors within an environment such as shielding or interference sources or the like.

According to fluctuation of the actual available bandwidth, the reception time of the rendering command receives influence, and accordingly, the excessive delay time ExtraDelay may also fluctuate according to fluctuation of the actual available bandwidth. However, small fluctuation that accidentally may occur is allowed to be ignored.

As apparent from Expression (6), in the event that the estimated value stored as the available bandwidth 329 is approximate to the actual available bandwidth, the absolute value of the excessive delay time ExtraDelay is also relatively small. Accordingly, in the event that the absolute value of the excessive delay time ExtraDelay is relatively small, the excessive delay time ExtraDelay may be considered to have been caused due to a small fluctuation that may accidentally occur. That is to say, in this case, the estimated value stored as the available bandwidth data 329 may not be updated.

Moreover, if the excessive delay time ExtraDelay is equal to or below the second threshold, it is desirable that the estimated value stored as the available bandwidth data 329 is to be updated (specifically, it is desirable that the estimated value being increased). This is because if the excessive delay time ExtraDelay is equal to or below the second threshold, there remains a possibility that the estimated value stored as the available bandwidth data 329 will be too small. That is to say, there is a possibility that a portion of the actual available bandwidth will not be utilized but be idle.

Specifically, if the excessive delay time ExtraDelay is equal to or below the second threshold, there may be room for increasing frequency for the rendering command being transmitted from the server 310 to the client 320 depending on the actual available bandwidth. In other words, there may be a case where a display frame rate at the client 320 is increased to further smooth the screen display, and consequently, usability is further improved.

Accordingly, if the excessive delay time ExtraDelay is equal to or below the second threshold, in order to check whether or not the above-mentioned possibility is actually plausible, the estimating unit 326 may increase the estimated value for available bandwidth. The client 320 notifies the estimated value for greater available bandwidth to the server 310, thereby indirectly increasing frequency for transmitting the rendering command from the server 310 to the client 320.

That is to say, the second threshold is a threshold for dividing into a case where the estimated value is maintained without updating the available bandwidth data 329, and a case where whether or not the above-mentioned possibility is plausible, is aggressively checked.

Conversely, if the excessive delay time ExtraDelay is very long (specifically, longer than the first threshold), the estimated value stored as the available bandwidth data 329 is considered to be too much. Also, in this case, there is little possibility that the excessive delay time ExtraDelay will accidentally become positive due to small fluctuations that may accidentally occur. On the contrary, in this case, there is a great possibility that the excessive delay time ExtraDelay will exceed the first threshold due to a process (e.g., process such as the timing chart 123 in FIG. 3) where delay is gradually accumulated while transmission of the rendering command is repeated.

Accordingly, if the excessive delay time ExtraDelay is longer than the first threshold, it is suitable to decrease the estimated value stored as the available bandwidth data 329 (i.e., to the estimated value is approximated to the actual available bandwidth). That is to say, the first threshold is a threshold for distinguishing small fluctuation that may accidentally occur and accumulation of delay due to excessive estimation of the available bandwidth.

Now, description will return to description in step S217. If the excessive delay time ExtraDelay is longer than 300 ms, in order to decrease the available bandwidth EstBW, the processing proceeds to step S218. If the excessive delay time ExtraDelay is longer than 0 ms but 300 ms or shorter, the estimating unit 326 maintains the available bandwidth EstBW without change, and the processing proceeds to step S220. If the excessive delay time ExtraDelay is 0 ms or shorter, the processing proceeds to step S221 in order to increase the available bandwidth EstBW.

In step S218, the estimating unit 326 stores, in order to decrease the excessive estimated value, an average value of the current value of the available bandwidth EstBW, and the average reception bit rate BPS_avr calculated in step S210, as new available bandwidth EstBW. That is to say, the estimating unit 326 updates the available bandwidth data 329 in accordance with Expression (7). "EstBW" in the right side of Expression (7) indicates the current value of the available bandwidth, and "EstBW" in the left side indicates the value of the available bandwidth after updating.

$$EstBW=(EstBW+BPS\_awr)/2 \qquad (7)$$

Note that, depending on the embodiment, the estimating unit 326 may update the available bandwidth data 329 in accordance with an expression other than Expression (7). For example, the estimating unit 326 may update the available bandwidth data 329 in accordance with Expression (8) using an appropriate constant $C_1$ satisfying $0<C_1 \leq 1$.

$$EstBW=(1-C_1) \times EstBW + C_1 \times BPS\_avr \qquad (8)$$

Expression (7) is an example of a case where the constant $C_1$ in Expression (8) is ½. The smaller the constant $C_1$ is, the more gradual the change in the available bandwidth EstBW becomes.

Next, in step S219 the estimating unit 326 uses the available bandwidth EstBW updated in step S218 to recalculate the excessive delay time ExtraDelay.

Specifically, the estimating unit 326 uses the available bandwidth EstBW after updating to recalculate the estimated transfer time EstT_trans by Expression (4). The estimating unit 326 then uses the recalculated estimated transfer time EstT_trans to recalculate the excessive delay time ExtraDelay by Expression (6).

After recalculation of the excessive delay time ExtraDelay, the processing proceeds to step S220. Note that there are many cases where difference between the excessive delay time ExtraDelay calculated in step S216 and the excessive delay time ExtraDelay recalculated in step S219 is inconspicuous. Accordingly, for simplification of the processing, depending on the embodiment, step S219 may be omitted.

In step 210, the estimating unit 326 outputs the available bandwidth EstBW and excessive delay time ExtraDelay to the transmission unit 323. In response to this, the transmission unit 323 transmits a notification including the available bandwidth EstBW and excessive delay time ExtraDelay to the server 310. The processing then returns to step S202 in FIG. 8.

In step S221, the estimating unit 326 increases the value of the available bandwidth EstBW. Specifically, the estimating unit 326 uses an appropriate relatively small positive constant $C_2$ to calculate the value of new available bandwidth EstBW by Expression (9), and updates the available bandwidth data 329. The symbol "EstBW" in the right side of Expression (9) indicates the current estimated value of the available bandwidth, and the symbol "EstBW" in the left side indicates a new estimated value of the available bandwidth.

$$EstBW=EstBW \times (1+C_2) \qquad (9)$$

In FIG. 9, the case of $C_2=0.1$ is exemplified. As described above, step S221 is executed in the event that the excessive delay time ExtraDelay is 0 ms or shorter, and in this case, there may be room to increase the frame rate. Accordingly, in step S221, in order to check whether or not there is room to increase the frame rate, the estimating unit 326 increases the value of the available bandwidth EstBW.

Note that the estimating unit 326 may calculate a new estimated value for available bandwidth by adding a predetermined positive value to the current estimated value for available bandwidth instead of multiplying the current estimated value for available bandwidth by a predetermined value greater than 1 as with Expression (9).

Next, in step S222, the estimating unit 326 uses the available bandwidth EstBW updated in step S221 to recalculate the excessive delay time ExtraDelay.

Specifically, the estimating unit 326 uses the updated available bandwidth EstBW to recalculate the estimated transfer time EstT_trans by Expression (4). The estimating unit 326 uses the recalculated estimated transfer time EstT_trans to recalculate the excessive delay time ExtraDelay by Expression (6).

After recalculation of the excessive delay time ExtraDelay, the processing proceeds to step S220. Note that difference between the excessive delay time ExtraDelay to be calculated in step S216 and the excessive delay time ExtraDelay to be recalculated in step S222 is often inconspicuous. Accordingly, for simplification of the processing, depending on the embodiment, step S219 may be omitted.

Figure 10:
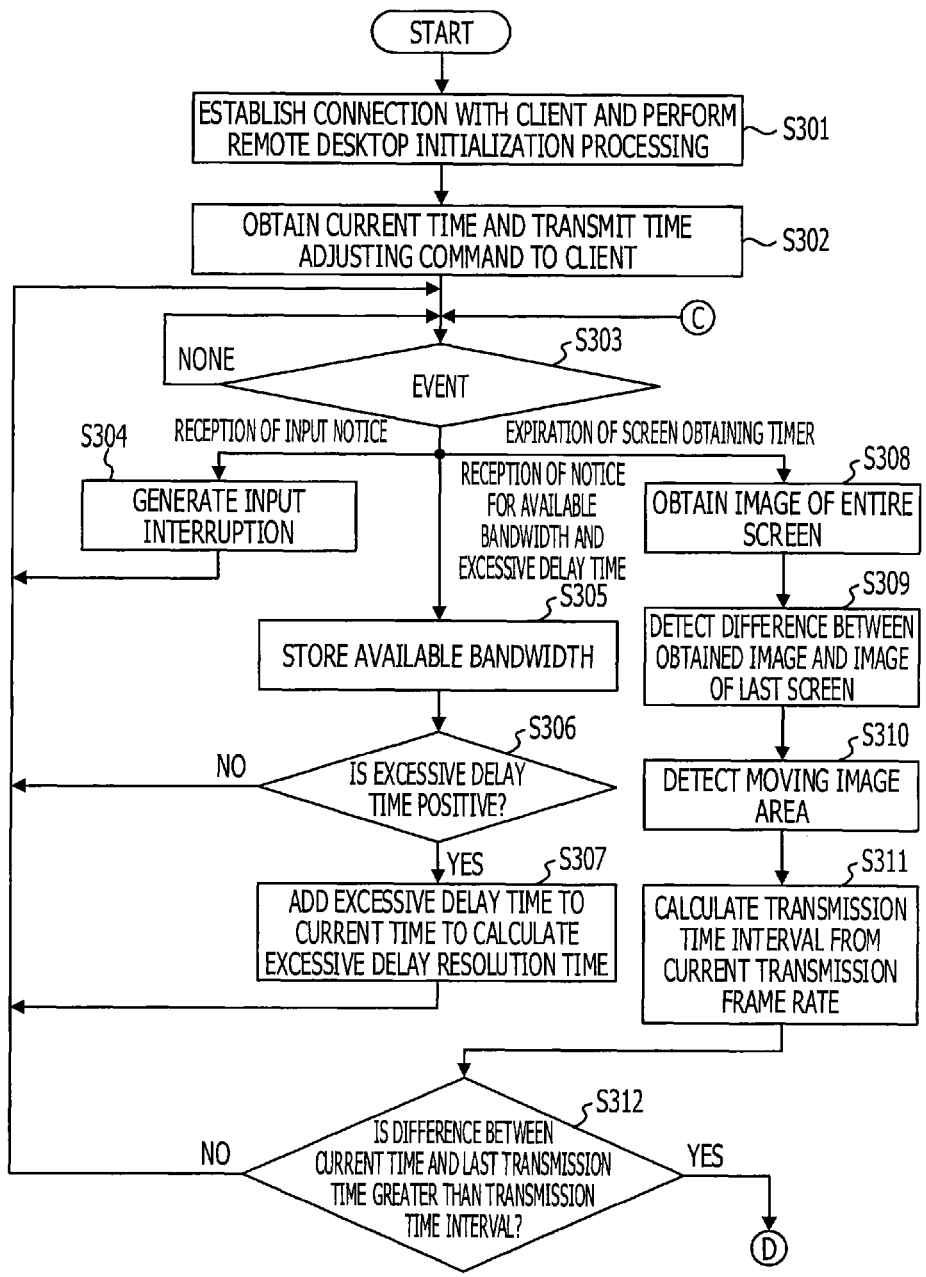
FIG. 10 is a first server operation flowchart.
Figure 11:
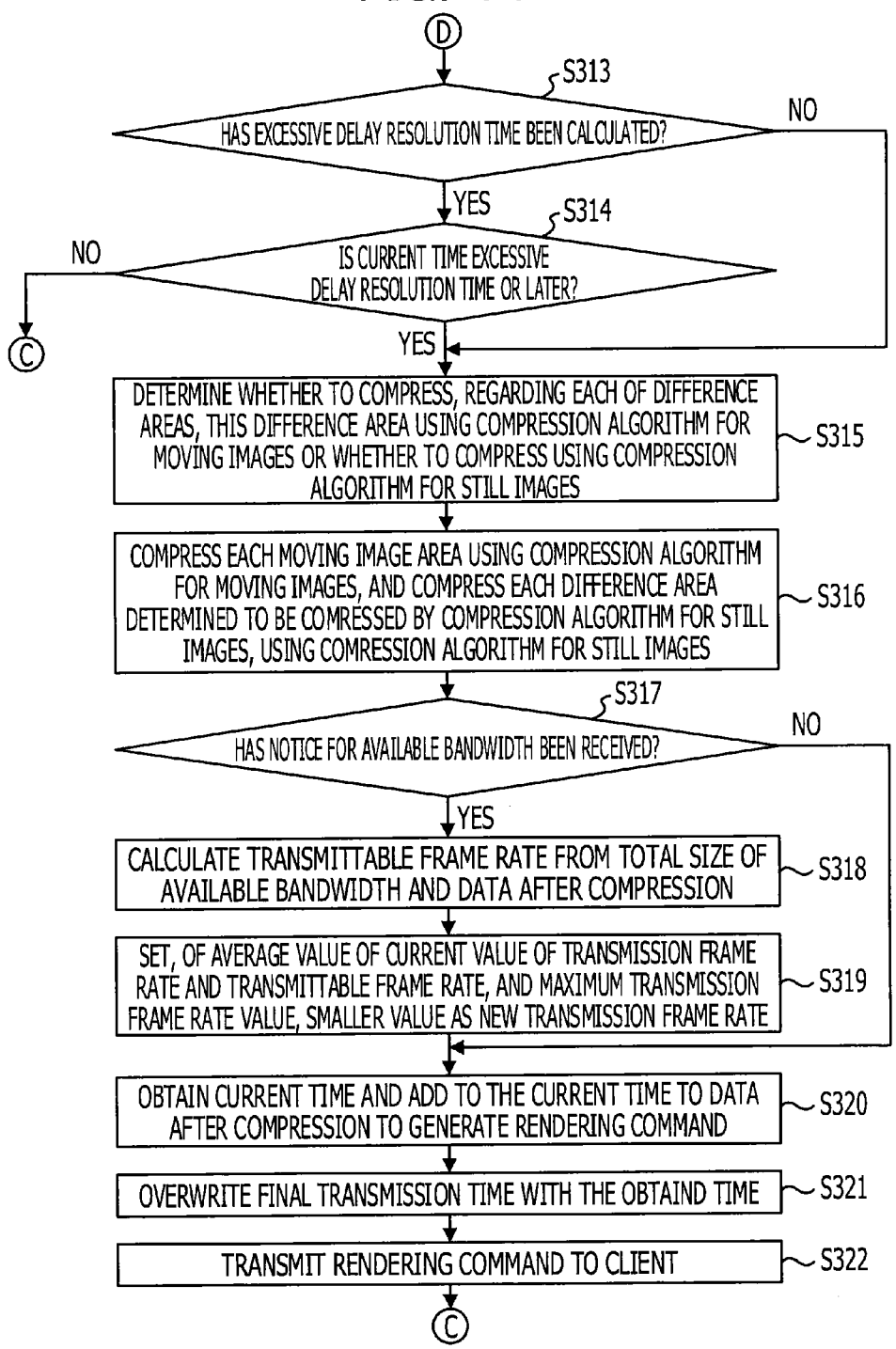
FIG. 11 is a second server operation flowchart.

FIGS. 10 to 11 are operation flowcharts of the server 310 common to the second to fourth embodiments. Upon receiving a connection request from the client 320, the server 310 starts the processing in FIGS. 10 to 11.

In step S301, the server 310 establishes connection with the client 320, and performs remote desktop initialization processing. For example, the server 310 may receive information of resolution for the display unit 322, an input method to be used, or the like from the client 320. The server 310 may create an execution environment (runtime environment) for executing one or more programs for the client 320 within the server 310, and perform environment setting for the runtime environment according to the information received from the client 320.

The runtime environment to be generated within the server 310 may be a process on the server 310 depending on the embodiment, or may be a virtual machine on the server 310 (i.e., physical machine), for example. Also, the above-mentioned one or more programs that the sever 310 executes for the client 320 specifically includes an OS, and may further include an application program.

Next, in step S302, the adding unit 315 obtains the current time to generate a time adjusting command including time information that indicates the current time (i.e., timestamp). The transmission unit 313 then transmits the time adjusting command to the client 320.

Next, in step S303, the server 310 waits for occurrence of an event.

Upon an event to the effect that the reception unit 311 has received an input notification from the client 320 occurring, the processing proceeds to step S304. The input notification is a notification to be transmitted from the client 320 in step S203 in FIG. 8.

Or, upon an event to the effect that the reception unit 311 has received a notification for available bandwidth and excessive delay time from the client 320 occurring, the processing proceeds to step S305. The notification for available bandwidth and excessive delay time is a notification to be transmitted from the client 320 in step S220 in FIG. 9.

Incidentally, the generating unit 312 of the server 310 includes a screen obtaining timer which expires with a predetermined interval. The screen obtaining timer may specifically be realized by a built-in timer of the CPU 241 in FIG. 5.

With the second to fourth embodiments, the maximum value of the transmission frame rate has been decided beforehand, and the interval for the screen obtaining timer expiring is set beforehand according to the maximum value of the transmission frame rate. Hereinafter, for convenience of description, let us say that the maximum value of the transmission frame rate is 30 fps. Accordingly, the expiration interval of the screen obtaining timer is 1/30 seconds.

Upon an event serving as expiration of the screen obtaining timer occurring, the processing proceeds from step S303 to step S308.

In the event that the input notification has been received, in step S304 the generating unit 312 generates an input interruption according to the contents of the input notification received by the reception unit 311. The processing then returns to step S303.

Note that, though omitted in FIGS. 10 to 11 for simplification of description, after completion of the remote desktop initialization processing in step S301, the generating unit 312 starts execution of the OS on the above-mentioned runtime environment. The input interruption generated by the generating unit 312 in step S304 may become a trigger to activate an application program (e.g., a case where a double clicking operation on a predetermined icon has been notified). In this case, the generating unit 312 starts execution of a new application program according to the generated input interruption.

Or, the input interruption that the generating unit 312 generates in step S304 may represent input for an activated program (e.g., may be an OS or application program). In this case, the generating unit 312 performs processing according to the input interruption at a process to execute the activated program.

For example, there may be a case where a text editor has been activated, and also the input interruption corresponds to key input. In this case, the generating unit 312 may perform processing for displaying a character in a cursor position at a process to execute a program of the text editor, in accordance with the input interruption.

Also, there may be a case where a CAD application has been activated, and also the input interruption corresponds to input for command call such as "rotation" or the like within the CAD application (e.g., a menu selection operation from a menu bar). In this case, the generating unit 312 may call up a command within the CAD application according to the input interruption at a process to execute a program of the CAD application.

Also, there may be a case where the input interruption corresponds to input for ending an activated application program (e.g., an operation for selecting a "end" menu). In this case, the generating unit 312 ends, in response to the input interruption, execution of this application program.

For example, as exemplified above, the generating unit 312 generates an input interruption according to the contents of the input notification from the client 320, and executes a program according to the contents of the input interruption.

Now, description will return to the description in FIGS. 10 to 11. In step S305, the adjusting unit 314 reads available bandwidth from the notification for available bandwidth and excessive delay time received by the reception unit 311. The adjusting unit 314 then stores the notified available bandwidth. That is to say, the adjusting unit 314 rewrites the available bandwidth within the transmission control data 316 with the notified value.

Next, in step S306, the adjusting unit 314 reads the excessive delay time from the notification for available bandwidth and excessive delay time, and decides whether or not the notified excessive delay time is positive. When the excessive delay time is positive, the processing proceeds to step S307. Conversely, in the event that the excessive delay time is zero or less, the processing returns to step S303.

In step S307, the adjusting unit 314 obtains the current time, adds the excessive delay time to the current time to calculate excessive delay resolution time. The adjusting unit 314 then rewrites the excessive delay resolution time within the transmission control data 316 with the calculated value.

The current time obtained in step S307 is time represented by the clock of the server 310. Hereinafter, for convenience of description, the current time to obtained in step S307 will be represented as "T_now_s", and the excessive delay resolution time to be calculated in step S307 will be represented as "T_solved". Calculation of the excessive delay resolution time T_solved in step S307 is as Expression (10).

$$T\_solved = T\_now\_s + ExtraDelay \qquad (10)$$

After calculation of the excessive delay resolution time T_solved, the processing returns to step S303.

Now, in the event that the screen obtaining timer has expired, in step S308 the generating unit 312 obtains an image of the entire screen (i.e., frame image).

As described above, the generating unit 312 continues execution of one or more programs, and generates, in response to execution of a program, an image to be displayed on the screen of the display unit 322 of the client 320. For example, the data of the image may be stored in a first memory area within the RAM 243 of the computer 240 which realizes the server 310, in an uncompressed bitmap format. The first memory area is specifically an area within a frame buffer assigned for the client 320, and a memory area for emulating VRAM of the client 320 as viewed from a certain viewpoint.

The generating unit 312 may update, at a process for executing the program, the image by rewriting a portion or the entire data within the first memory area according to progress in execution of the program. In the step S308, the generating unit 312 may obtain the image of the entire screen by reading the data of the image from the first memory area.

In the next step S309, the generating unit 312 detects difference between the image obtained in step S308 this time and the image obtained when the screen obtaining timer expired.

For example, when the screen obtaining timer expires, the data of the image obtained by the generating unit 312 may be stored in a second memory area different from the first memory area within the RAM 243. The generating unit 312 may detect difference between the image obtained this time and the image of the last screen by comparing the images in the first and second memory areas. Note that the generating unit 312 may further hold the past frame images in another memory area other than the first and second memory areas for inter-frame prediction or motion compensation in later-described moving-image compression.

Next, in step S310, the generating unit 312 detects an area to be compressed by a moving-image compression algorithm (hereinafter, referred to as "moving-image area"). With the example in FIG. 2, the area 111 is a moving-image area. A method for detecting a moving-image area is familiar, and accordingly, detailed description will be omitted, but for example, the generating unit 312 may detect a moving-image area as follows.

As exemplified in FIG. 2, the screen may be divided into H×V blocks. In this case, the generating unit 312 may count, regarding each of the H×V blocks, the number of times for difference being detected in this block in step S309, and compare the count result with a predetermined threshold. The generating unit 312 may determine a block of which the count result is equal to or greater than the threshold to be a block where change has occurred with high frequency, and determine a block of which the count result is less than the threshold to be a block where frequency to generate change is low.

For example, the generating unit 312 may store whether or not difference has been detected in each of the latest Q executions (Q>1) in step S308 regarding each of the blocks. The generating unit 312 may count how many times of the Q times difference has been detected regarding each of the blocks, and compare the count with the above-mentioned threshold.

As described above, the number of blocks where occurrence of change has been detected with high frequency may be 0, or may be 1, or may be more than one.

In the event of having detected occurrence of change with high frequency in multiple blocks, the generating unit 312 may individually determine each of the multiple blocks to be a moving-image area.

Or, there may be a case where some blocks in which occurrence of frequent change has been detected are adjacent or close to each other. In this case, the generating unit 312 may determine a rectangular area including the blocks adjacent or close to each other (the smallest rectangular area including the blocks adjacent or close to each other) to be a moving-image area.

For example, as described above, the generating unit 312 detects a moving-image area in step S310. Accordingly, in some cases, there may be a case where no moving-image area has been detected, a case where one moving-image has been detected, or a case where multiple scattered moving-image areas have been detected.

Next, in step S311, the adjusting unit 314 references the transmission control data 316 to obtain the current transmission frame rate (hereinafter, represented as "FPS_cur"). The adjusting unit 314 then calculates a transmission time interval (hereinafter, represented as "Int") from the current transmission frame rate FPS_cur by Expression (11).

$$Int = 1/FPS\_cur \qquad (11)$$

Next, in step S312, the adjusting unit 314 obtains the current time (hereinafter, represented as "T_now_s"). Also, the adjusting unit 314 references the transmission control data 316 to obtain the last transmission time (hereinafter, represented as "T_last"). The adjusting unit 314 then determines whether or not difference between the current time T_now_s and the last transmission time T_last is greater than the transmission time interval Int calculated in step S311. That is to say, the adjusting unit 314 determines whether or not Inequality Expression (12) holds.

$$T\_now\_s - T\_last > Int \qquad (12)$$

In the event that Inequality Expression (12) does not hold, the rendering command has not still to be transmitted to the client 320. Accordingly, the processing returns to step S303. Conversely, in the event that Inequality Expression (12) holds, in order to determine whether to transmit the rendering command to the client 320, the processing proceeds to step S313 in FIG. 11.

In step S313, the adjusting unit 314 determines whether or not the excessive delay resolution time T_solved has been calculated. Specifically, the adjusting unit 314 references the transmission control data 316 to determine whether or not a valid value (i.e., a value different from the initial value) has been stored as the excessive delay resolution time T_solved.

In the event that a valid value has been stored as the excessive delay resolution time T_solved, the excessive delay resolution time T_solved has been calculated. In this case, whether to transmit the rendering command to the client 320 depends on the excessive delay resolution time T_solved. Accordingly, in order to determine whether to transmit the rendering command according to the excessive delay resolution time T_solved, the processing proceeds to step S314.

Conversely, in the event that an invalid value has been stored as the excessive delay resolution time, the excessive delay resolution time has not been calculated yet. In this case, whether to transmit the rendering command to the client 320 simply depends on the difference between the current time T_now_s and the last transmission time T_last. Also, it has already been confirmed in step S312 that Inequality Expression (12) holds. Accordingly, the processing proceeds to step S315 for generation and transmission of the rendering command.

In step S314, the adjusting unit 314 determines whether or not the current time T_now_s is the excessive delay resolution time T_solved and thereafter. In the event that the current time T_now_s is prior to the excessive delay resolution time T_solved, the rendering command had better not be transmitted to the client 320, and accordingly, the processing returns to step S303. Conversely, in the event that the current time T_now_s is the excessive delay resolution time T_solved and thereafter, the processing proceeds to step S315 for generation and transmission of the rendering command.

Incidentally, hereinafter, for convenience of description, the area from which difference has been detected by the generating unit 312 in step S309 will be referred to as "difference area". For example, as exemplified regarding step S310, in the event that the screen has been divided into H×V blocks, in step S309, of the H×V blocks, difference is detected in zero, one, or multiple blocks. Each block where difference has been detected is one difference area.

In step S315, regarding each of the difference areas, the generating unit 312 decides whether to compress this difference area using the moving-image compression algorithm, or whether to compress this difference area using a still-image compression algorithm based on the detection results of a moving-image area in step S310. Specifically, in the event that the difference area is included in the moving-image area, the generating unit 312 determines to compress this difference area using the moving-image compression algorithm. Conversely, in the event that the difference area is not included in the moving-image area, the generating unit 312 determines to compress this difference area using the still-image compression algorithm.

For example, with the example in FIG. 2, the areas 112 and 113 are difference areas. However, the areas 112 and 113 are not included in the area 111 which is a moving-image area. Accordingly, the generating unit 312 determines to compress each of the areas 112 and 113 using a the still-image compression algorithm.

In the next step S316, the generating unit 312 compresses each of the moving-image areas using the moving-image compression algorithm, and compresses each of the difference areas determined to be compressed using the still-image compression algorithm, using the still-image compression algorithm.

Note that, as exemplified regarding step S310, there may be a case where a rectangular area including some difference areas is determined to be a moving-image area. In this case, a block where no difference has been detected may be included in the moving-image area, but the generating unit 312 compresses the entirety of the rectangular moving-image area using the moving-image compression algorithm. For example, with the example in FIG. 2, the generating unit 312 compresses the area 111 using the moving-image compression algorithm.

Next, in step S317, the adjusting unit 314 references the transmission control data 316 to determine whether or not a notification for available bandwidth has been received from the client 320. In the event that a valid value (i.e., a value other than the initial value) as available bandwidth has been stored, the notification for available bandwidth has been received, and accordingly, the processing proceeds to step S318. Conversely, in the event that an invalid value as available bandwidth has been stored, the notification for available bandwidth has not been received yet, and accordingly, the processing proceeds to step S320.

In step S318, the adjusting unit 314 references the transmission control data 316 to obtain the value of the available bandwidth EstBW. Also, the adjusting unit 314 recognizes a total size of data compressed by the generating unit 312 in step S316. For example, the generating unit 312 may notify a total size of compressed data to the adjusting unit 314.

The adjusting unit 314 then calculates size of the rendering command including this data in the payload form the total size of the compressed data. Specifically, according to the format of the rendering command, the adjusting unit 314 calculates the size of the rendering command by adding the length of each type of header and so forth to the total size of the compressed data. Hereinafter, for convenience of description, the size to be calculated will be represented as "Size_cmd", and let us say that this size is represented in byte units.

Now, in the event of assuming the following two points in (15a) and (15b), the maximum frame rate that enables transmission of the rendering command corresponding to each frame to be repeated within the range of the available bandwidth EstBW will be referred to as "transmittable frame rate".

(15a) The size of the rendering command corresponding to each frame is fixed.

(15b) Specifically, this fixed size is the size Size_cmd thus calculated.

The adjusting unit 314 calculates the transmittable frame rate (hereinafter, represented as "FPS_feasible") from the available bandwidth EstBW and the rendering command size Size_cmd. According to the above-mentioned definitions, the transmittable frame rate FPS_feasible is the maximum value satisfying Inequality Expression (13). Accordingly, the adjusting unit 314 calculates the transmittable frame rate FPS_feasible in accordance with Expression (14).

$$8 \times Size\_cmd \times FPS\_feasible \leq EstBW \quad (13)$$

$$FPS\_feasible = EstBW/(8 \times Size\_cmd) \quad (14)$$

As described above, after calculating the transmittable frame rate FPS_feasible in step S318, the processing proceeds to step S319. In step S319, the adjusting unit 314 references the transmission control data 316 to read the current transmission frame rate FPS_cur. The adjusting unit 314 then sets a new transmission frame rate based on the transmission frame rate FPS_cur and transmittable frame rate FPS_feasible. For example, the adjusting unit 314 may set a new transmission frame rate as follows.

As described regarding step S308, with the second to fourth embodiments, the maximum value for the transmission frame rate has already been determined beforehand. Hereinafter, for convenience of description, the maximum value for the transmission frame rate will be represented as "FPS_max". The adjusting unit 314 may set a smaller value of an average value between the transmission frame rate current value FPS_cur and the transmittable frame rate FPS_feasible, and the transmission frame rate maximum value FPS_max, as a new transmission frame rate.

Specifically, the adjusting unit 314 may calculate a new transmission frame rate in accordance with the right side in Expression (15), and store the calculated value as a transmission frame rate within the transmission control data 316. A symbol of "FPS_cur" in the left side in Expression (15) indicates the calculated new transmission frame rate.

$$FPS\_cur = \min(FPS\_max, (FPS\_cur + FPS\_feasible)/2) \quad (15)$$

Alternatively, the adjusting unit 314 may use an appropriate constant $C_3$ satisfying $0<C_3\le 1$ to update the transmission frame rate FPS_cur in accordance with Expression (16) instead of Expression (15). Expression (15) is an example in the event that the constant $C_3$ is ½.

$$FPS\_cur=\min(FPS\_\max,(1-C_3)\times FPS\_cur+C_3\times FPS\_feasible) \quad (16)$$

Also, in step S320, the adding unit 315 obtains the current time. The adding unit 315 further adds the current time to the data compressed by the generating unit 312, and generates a rendering command.

Note that, as described above, the format of the rendering command may be determined as appropriate depending on the embodiment. For example, with an embodiment wherein the rendering command with a format defined so as to include time information in the header of the application layer is employed, in step S320 the adding unit 315 writes the current time in a predetermined field for the time information within the header of the application layer. Or, with an embodiment wherein the rendering command with a format defined so as to include the time information in the payload is employed, in step S320 the adding unit 315 writes the current time in a predetermined field for the time information within the payload.

In step S321, the adding unit 315 overwrites the last transmission time within the transmission control data 316 with time obtained as the current time in step S320.

Further, in step S322, the transmission unit 313 transmits the rendering command generated by the adding unit 315 to the client 320. The processing then returns to step S303 in FIG. 10. Note that an execution sequence of steps S321 and S322 may be switched.

According to the second embodiment described above, even when the available bandwidth of the network between the client 320 and the server 310 is narrow, the screen information is transmitted with a frame rate according to the available bandwidth. Accordingly, accumulation of delay may be avoided, and somewhat satisfactory operation response performance is obtained. That is to say, even when the network condition is poor, deterioration in usability is suppressed. The advantages of such a second embodiment will further be described with reference to FIG. 12.

Figure 12:
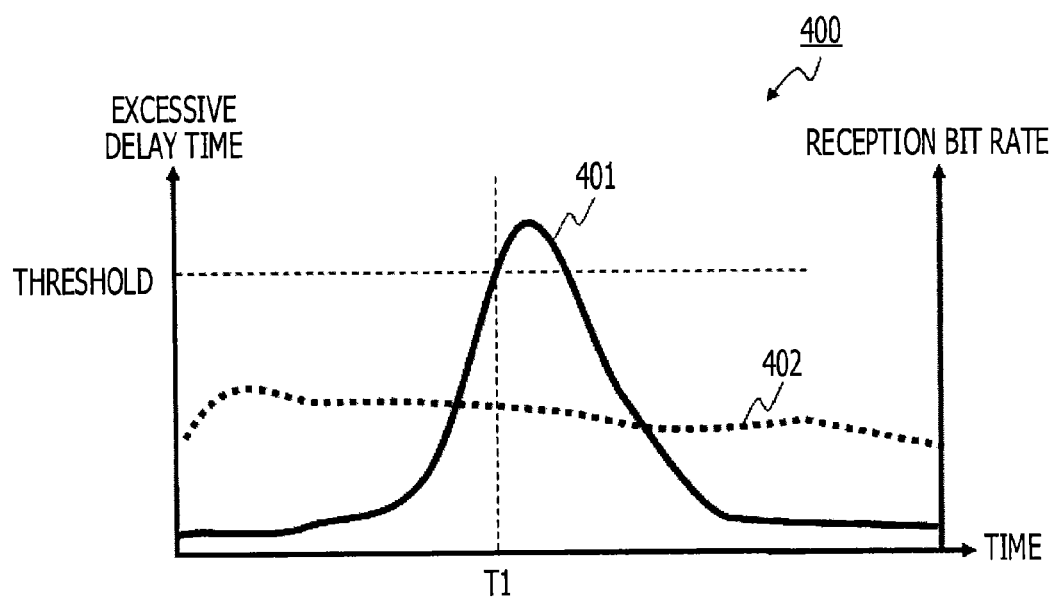
FIG. 12 is a graph illustrating an example of change of excessive delay time and a reception bit rate.

FIG. 12 is a graph illustrating an example of change in the excessive delay time and reception bit rate. In a graph 400 in FIG. 12, a curve 401 that indicates the excessive delay time, and a curve 402 that indicates a reception bit rate at the client 320 are illustrated.

With the example in FIG. 12, the reception bit rate does not fluctuate too much. However, for example, in the event that a default transmission frame rate is excessive for the actual available bandwidth, as illustrated with the curve 401, this may incur a situation in which the excessive delay time gradually increases. With the example in FIG. 12, the excessive delay time exceeds a threshold (300 ms in the example in FIG. 9) at time T1.

However, according to the second embodiment, when the excessive delay time exceeds the threshold, the estimated value for available bandwidth to be notified from the client 320 to the server 310 decreases, and accordingly, the transmission frame rate also decreases according thereto. Also, the server 310 may omit transmission of the screen information according to the excessive delay time notified from the client 320 (i.e., the processing may return to step S303 in FIG. 10 from step S314 in FIG. 11).

Accordingly, after the time T1, as time elapses for a while, communication traffic from the server 310 to the client 320 decreases, and the excessive delay time gradually shortens. As illustrated with the curve 401, the excessive delay time stabilizes at a small value soon. That is to say, according to the second embodiment, even if the excessive delay time were temporarily prolonged due to the network condition, and usability somewhat deteriorated, usability is restored to a somewhat satisfactory level by adjustment of the frame rate.

Figure 13:
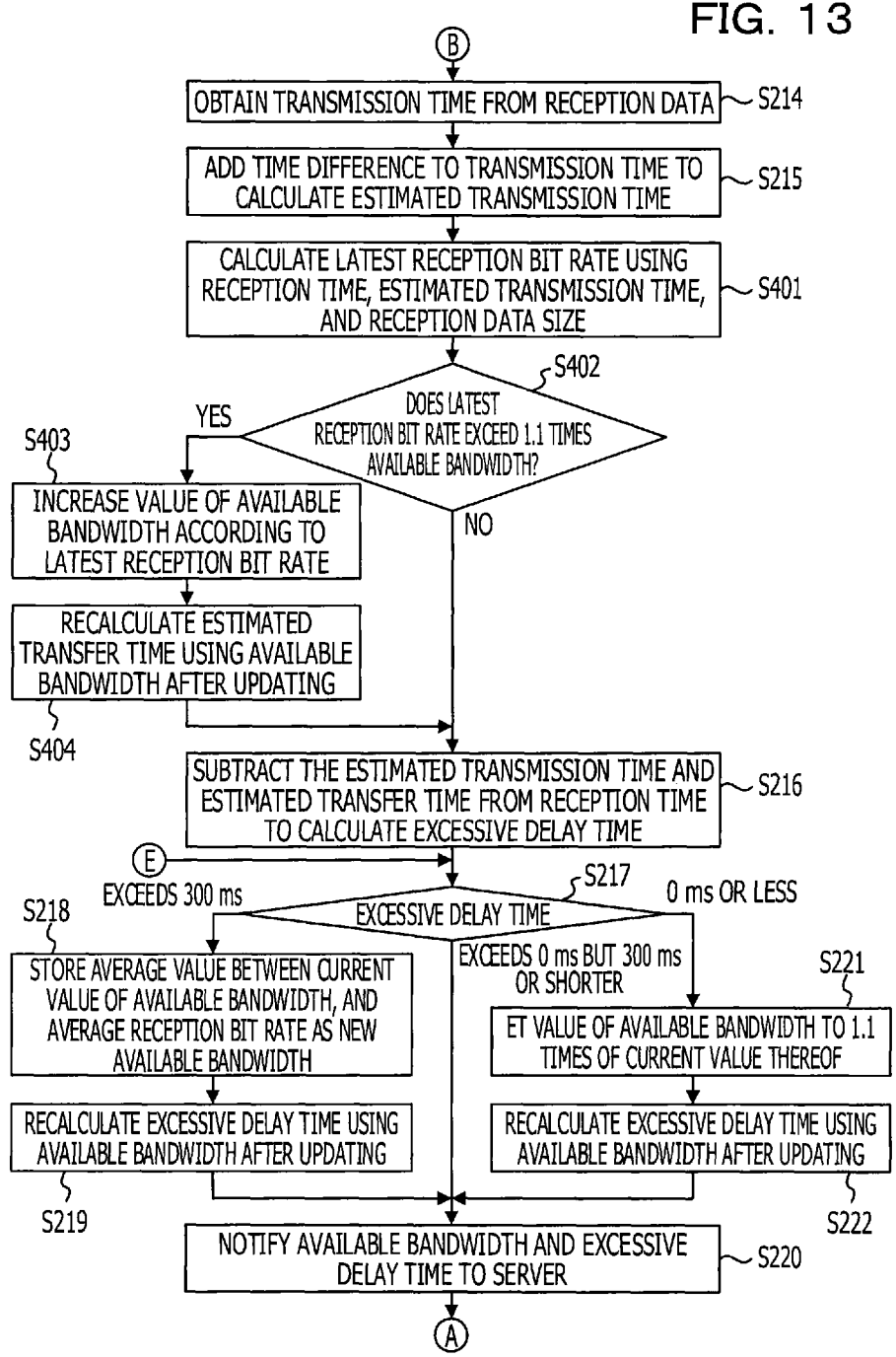
FIG. 13 is a client operation flowchart according to a third embodiment.

The third embodiment will be described next. FIG. 13 is an operation flowchart of a client according to the third embodiment. Note that the steps S201 through S213 in FIG. 8 are the same with the third embodiment as well. By comparing FIG. 13 with FIG. 9, we see that steps S401 through S404 have been added between steps S215 and S216 for the third embodiment.

In step S214, the estimating unit 326 obtains the transmission time T_sent, and in step S215 calculates the estimated transmission time EstT_sent from Expression (5). Steps S214 and S215 are the same as with FIG. 9.

Subsequently, in step S401 the estimating unit 326 calculates the latest reception bit rate, using the following values (16a) through (16c).

(16a) The point-in-time at which the data (i.e., rendering command) this time has been received by the reception unit 324, in other words, the reception time $T\_rcv_R$ stored in the newest entry in the reception history data 327.

(16b) The estimated transmission time EstT_sent calculated in step S215.

(16c) the size of the data this time received by the reception unit 324, in other words, the data size $Size\_rcv_R$ stored in the newest entry in the reception history data 327.

Hereinafter, for sake of convenience, the latest reception bit rate calculated in step S401 may also be written as "BPS_latest". The estimating unit 326 specifically calculates the latest reception bit rate BPS_latest following Expression (17).

$$BPS\_latest=8\times Size\_rcv_R/(T\_rcv_R-EstT\_sent) \quad (17)$$

Next, in step S402, the estimating unit 326 determines whether or not the latest reception bit rate BPS_latest is sufficiently great as compared to the current available bandwidth EstBW. Specifically, the estimating unit 326 determines whether or not the inequality expression (18) holds.

$$BPS\_latest>(1+C_4)\times EstBW \quad (18)$$

Note that "$C_4$" in the inequality expression (18) is a suitable positive constant. FIG. 13 illustrates an example in which the constant $C_4$ is 0.1. In the event that the constant $C_4$ is 0.1, for example, as illustrated in FIG. 13, the estimating unit 326 specifically determines whether or not the latest reception bit rate BPS_latest exceeds 1.1 times the current available bandwidth EstBW.

In the event that the inequality expression (18) holds, the processing proceeds to step S403. In the event that the inequality expression (18) does not hold, the processing proceeds to step S216.

Note that with the inequality expression (18), a value obtained by multiplying the available bandwidth EstBW by a predetermined value greater than 1 is used as a decision criterion value for comparison with the latest reception bit rate BPS_latest. However, depending on the embodiment, a value to which a predetermined positive value has been added to the available bandwidth EstBW may be used as a decision criterion value.

In step S403, the estimating unit 326 increases the value of the available bandwidth EstBW in accordance with the latest reception bit rate BPS_latest. For example, as illustrated in Expression (19), the estimating unit 326 may store the latest reception bit rate BPS_latest as a new available bandwidth EstBW.

$$EstBW = BPS\_latest \quad (19)$$

Alternatively, as illustrated in Expression (20), the estimating unit 326 may store an averaged value of the currently available bandwidth EstBW and the latest reception bit rate BPS_latest as a new available bandwidth EstBW.

$$EstBW = (EstBW + BPS\_latest)/2 \quad (20)$$

Note that the estimating unit 326 may calculate a new available bandwidth EstBW following Expression (21), using a suitable constant $C_5$ such that $0 < C_5 \leq 1$ holds.

$$EstBW = (1 - C_5) \times EstBW + C_5 \times BPS\_latest \quad (21)$$

Expression (19) illustrates a specific example of a case where the constant $C_5$ in Expression (21) is 1. Also, Expression (20) is a specific example of a case where the constant $C_5$ in Expression (21) is ½.

The closer the value of the constant $C_5$ is to 1, the quicker the available bandwidth estimated value EstBW may follow the actual increase in available bandwidth in the event that the actual available bandwidth suddenly increases. For example, in a case where Expression (19) is used, the frame rate may be quickly raised in response to a favorable change in network conditions, so display on the display unit 322 of the client 320 may be made to be smoother due to the raised frame rate.

Also, the smaller the constant $C_5$ is, the more gradual the change in available bandwidth EstBW is. For example, using Expression (20) yields the effects that smooth control may be effected even in the event that the available bandwidth fluctuates violently.

Note that since the inequality expression (18) holds, the value of available bandwidth EstBW increases regardless of which of Expressions (19) through (21) is used. Specifically, the value of the available bandwidth EstBW will exceed the value of the value so far multiplied by $(1 + C_4 \times C_5)$.

Next, in step S404 the estimating unit 326 uses the available bandwidth EstBW updated in step S403 to recalculate the estimated transfer time EstT_trans by Expression (4). The processing then proceeds to step S216.

In step S216, the estimating unit 326 calculates the excessive delay time ExtraDelay by Expression (6). Expressions (4) and (6) illustrate that in the event that the available bandwidth EstBW is updated in step S403, the update of the available bandwidth EstBW is also reflected in the excessive delay time ExtraDelay calculated in step S216.

In step S217, the estimating unit 326 determines whether the excessive delay time ExtraDelay is longer than 300 ms, longer than 0 ms but 300 ms or shorter, or 0 ms or shorter.

In the event that the excessive delay time ExtraDelay is longer than 300 ms, the estimating unit 326 updates the available bandwidth data 329 following Expression (7) in step S218 (i.e., reduces the value of the available bandwidth EstBW). With the present embodiment, Expression (8) may be used instead of Expression (7). The estimating unit 326 then recalculates the excessive delay time ExtraDelay in step S219. Subsequently, in step S220 the available bandwidth EstBW and excessive delay time ExtraDelay are notified from the transmission unit 323 to the server 310.

In the event that the excessive delay time ExtraDelay is longer than 0 ms but 300 ms or shorter, in step S220 the available bandwidth EstBW and excessive delay time ExtraDelay are notified from the transmission unit 323 to the server 310.

In the event that the excessive delay time ExtraDelay is 0 ms or shorter, the estimating unit 326 updates the available bandwidth data 329 following Expression (9) in step S221 (i.e., increases the value of the available bandwidth EstBW). The estimating unit 326 then recalculates the excessive delay time ExtraDelay in step S222. Subsequently, in step S220 the available bandwidth EstBW and excessive delay time ExtraDelay are notified from the transmission unit 323 to the server 310.

Following the notification in step S220, the processing returns to step S202 in FIG. 8.

As illustrated in FIG. 13, the following three cases of (17a) through (17c) may occur with the third embodiment. The cases of (17a) through (17c) are all the same with regard to the point that the estimating unit 326 increases the available bandwidth EstBW, and that the increased available bandwidth EstBW is notified to the server 310.

(17a) A case where both steps S403 and S221 are executed.
(17b) A case where step S403 is executed and step S221 is not executed.
(17c) A case where step S403 is not executed and step S221 is executed.

Also, the constant $C_4$ in the inequality expression (18) in step S402, the constant $C_5$ in Expression (21) in step S403, and the constant $C_2$ in Expression (9) in step S221 may be determined as suitable according to the embodiment. For example, the three constants may be decided so as to satisfy the following inequality expression (22).

$$C_2 C_4 \times C_5 \quad (22)$$

The inequality expression (22) indicates placing greater emphasis on following the following (18b) equivalent to step S403 rather than the determination of the following (18a) equivalent to step S221 in the calculation of the estimated value of the available bandwidth EstBW.

(18a) A determination that "there is a possibility that the actual value of the available bandwidth is greater than the current estimation value" in a case where the excessive delay time is at or below a predetermined threshold value (specifically, the value of 0 ms used in step S217).
(18b) Following increase to the actual latest bit rate.

Note that the third embodiment may be modified as follows. Specifically, in the event that step S403 is executed, the estimating unit 326 may omit the determination performed at step S217 following execution of steps S404 and S216, and output the available bandwidth EstBW and excessive delay time ExtraDelay to the transmission unit 323. The transmission unit 323 may then notify the available bandwidth EstBW and excessive delay time ExtraDelay to the server 310 in step S220.

Next, a fourth embodiment will be described. The fourth embodiment is advantageous in that the estimation precision of the available bandwidth may be improved, as described below.

Specifically, with the fourth embodiment, in the event that the excessive delay time ExtraDelay is at or below a predetermined threshold (e.g., 0 ms), the client 320 notifies the server 310 of a value greater than the estimation value so far, instead of immediately increasing the estimated value of the available bandwidth EstBW. The client 320 indirectly controls the transmission frame rate by notifying a great value to the server 310 (specifically, raises the frame rate).

The data size of rendering commands which the server 310 sends fluctuates depending on applications being executed and user input. However, overall, the higher the transmission frame rate is, the greater the amount of data which the server 310 transmits to the client 320 per time increment is.

Accordingly, as long as the actual available bandwidth is greater than the current estimation value of the available bandwidth, we may assume that there will be no detention of data on the route even if the transmission frame rate is raised. That is to say, if the actual available bandwidth is greater than the current estimation value of the available bandwidth, the reception bit rate may be assumed to rise in accordance with the rise in the transmission frame rate.

Accordingly, after having notifying a great value to the server 310 as described above, upon confirming an actual rise in the reception bit rate the client 320 increases the estimated available bandwidth value EstBW. That is to say, upon confirming that the actual available bandwidth has room to handle raising of the transmission frame rate, the client 320 increases the estimated available bandwidth value EstBW.

As described above, with the fourth embodiment, the client 320 increases the estimated available bandwidth value EstBW based on the rise in the actual reception bit rate, so the precision of estimation of the available bandwidth improves. Improving the precision of estimation of the available bandwidth also improves the precision of the excessive delay time ExtraDelay. Accordingly, with the fourth embodiment, screen information (e.g., rendering commands) is transmitted at a frequency more in line with the actual available bandwidth.

Note that with the fourth embodiment, there are cases where the client 320 notifies the server 310 of a value greater than the estimated available bandwidth value EstBW as described above, and there are cases where the client 320 notifies the server 310 of the estimated available bandwidth value EstBW itself. In either case, the client 320 stores the value notified thereto.

Figure 7E:
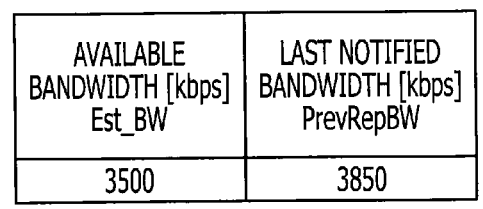

Specifically, with the fourth embodiment, the available bandwidth data 329 illustrated in FIG. 6 includes not only the available bandwidth but also the last notified bandwidth, as with the available bandwidth data 329b in FIG. 7E. The client 320 stores the value notified to the server 310 as the last notified bandwidth. Hereinafter, the last notified bandwidth may be written as "PrevRepBW" for sake of convenience.

Figure 14:
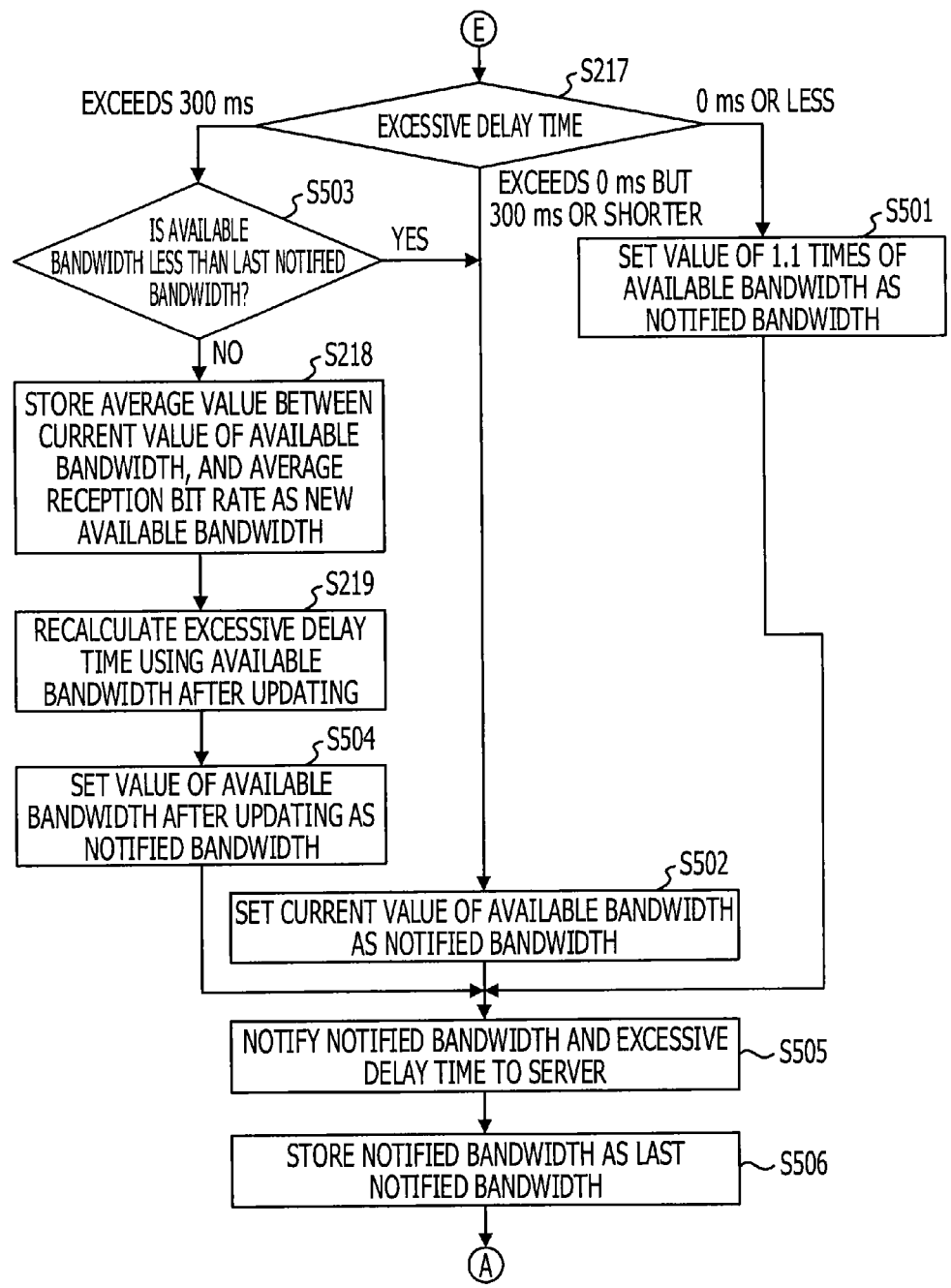
FIG. 14 is a client operation flowchart according to a fourth embodiment.

Next, more detailed description of the fourth embodiment will be made with reference to FIG. 14. FIG. 14 is an operation flowchart of a client according to the fourth embodiment. Note that steps S201 through S213 in FIG. 8 are the same as with the fourth embodiment.

As will be understood by comparing FIG. 14 with FIG. 13, with the fourth embodiment, the processing between steps S217 and S220 in FIG. 13 is replaced with the processing in FIG. 14. That is to say, with the fourth embodiment, after step S213 in FIG. 8, the steps S214, S215, S401, and S402 in FIG. 13 are executed. Further, depending on the determination results of step S402, steps S403 and S404 are also executed. Subsequently, step S216 is executed and the excessive delay time ExtraDelay is calculated, following which step S217 in FIG. 14 is executed.

Accordingly, the value of the available bandwidth EstBW at the point that step S217 in FIG. 14 is executed, is one of the following (19a) through (19c).

(19a) Value calculated by Expression (3) in step S212.
(19b) Value updated by Expression (21) in step S403.
(19c) Value already stored in available bandwidth data 329b as available bandwidth at the point that the rendering command has been received this time.

Also, the excessive delay time ExtraDelay referenced in step S217 depends on the available bandwidth EstBW, as indicated in Expressions (4) and (6). In step S217, the estimating unit 326 determines whether the excessive delay time ExtraDelay is 0 ms or shorter, longer than 0 ms but 300 ms or shorter, or longer than 300 ms, in the same way as with the second and third embodiments.

In the event that the excessive delay time ExtraDelay is 0 ms or shorter, the processing proceeds to step S501. In the event that the excessive delay time ExtraDelay is longer than 0 ms but 300 ms or shorter, processing proceeds to step S502. In the event that the excessive delay time ExtraDelay is longer than 300 ms, the processing proceeds to step S503.

In step S501, the estimating unit 326 sets a value greater than the available bandwidth EstBW as the notified bandwidth, instead of increasing the value of the available bandwidth EstBW, as with the case of step S221 in FIGS. 9 and 13. Hereinafter, the notified bandwidth may also be written as "RepBW" for sake of convenience.

The notified bandwidth RepBW is a value which the client 320 notifies to the server 310. As described later, there are cases where the available bandwidth EstBW itself is used as the notified bandwidth RepBW.

Specifically, in step S501 the estimating unit 326 uses a relatively small positive constant $C_6$ that is suitable, to determine the value of the notified bandwidth RepBW according to Expression (23). FIG. 14 illustrates a case where $C_6=0.1$.

$$RepBW=(1+C_6) \times EstBW \qquad (23)$$

Note that as indicated in (19b) described above, the available bandwidth EstBW in Expression (23) may be a value increased in step S403. In this case, from one perspective, the notified bandwidth RepBW calculated by Expression (23) may be considered to by a type of indicator value emphasizing the increase of the available bandwidth EstBW.

Depending on the embodiment, the estimating unit 326 may add a predetermined positive value to the available bandwidth EstBW to calculate the notified bandwidth RepBW, instead of multiplying the available bandwidth EstBW by a predetermined value greater than 1 as indicated in Expression (23).

Note that step S501 is executed in a case where the excessive delay time ExtraDelay is 0 ms or shorter. In this case, there is a possibility that "the current estimated available bandwidth value EstBW is excessively smaller than the actual value". Accordingly, in order to verify whether or not this possibility actually holds, the estimating unit 326 sets the notified bandwidth RepBW so as to be greater than the available bandwidth EstBW in step S501. After executing step S501, the processing proceeds to step S505.

In step S502, the estimating unit 326 sets the notified bandwidth RepBW to the current value of the available bandwidth EstBW. That is to say, step S502 is expressed as in Expression (24). After executing step S502, the processing proceeds to step S505.

$$RepBW=EstBW \qquad (24)$$

In step S503, the estimating unit 326 references the available bandwidth data 329b, and determines whether or not the available bandwidth EstBW is smaller than the last notified bandwidth PrevRepBW. That is to say, the estimating unit 326 determines whether or not the inequality expression (25) holds.

$$EstBW<PrevRepBW \qquad (25)$$

In the event that the inequality expression (25) holds, the processing proceeds to step S502. On the other hand in the event that the inequality expression (25) does not hold, the processing proceeds to step S218. The significance of the determination made in step S503 will be described later, after describing through step S506.

In step S218, the estimating unit 326 updates the available bandwidth EstBW following the Expression (7) (or Expression (8) which is a generalization of Expression (7)) reiterated here. FIG. 14 exemplarily illustrates a case of Expression (7) being used in step S218.

$$EstBW=(EstBW+BPS\_avr)/2 \qquad (7)$$

$$EstBW=(1-C_1)\times EstBW+C_1\times BPS\_avr \qquad (8)$$

In the following step S219, the estimating unit 326 uses the available bandwidth EstBW updated in step S218 to recalculate the excessive delay time ExtraDelay. As described with the second embodiment, change in value due to recalculation is relatively small, so the recalculation in step S219 may be omitted.

Next, in the following step S504, the estimating unit 326 sets the value of the available bandwidth EstBW updated in step S218 so as to be the notified bandwidth RepBW. Step S504 is expressed as in Expression (26).

$$RepBW=EstBW \qquad (26)$$

After setting the notified bandwidth RepBW, the processing proceeds to step S505. Note that depending on the embodiment, the order of execution of steps S219 and S504 may be reversed.

In step S505, the estimating unit 326 outputs the notified bandwidth RepBW and the excessive delay time ExtraDelay to the transmission unit 323, whereupon the transmission unit 323 transmits a notification including the notified bandwidth RepBW and the excessive delay time ExtraDelay to the server 310.

Note that at the server 310, the notified bandwidth RepBW notified from the client 320 is handled as the available bandwidth EstBW. Accordingly, in step S305 in FIG. 10, the notified bandwidth RepBW notified from the client 320 is stored as the available bandwidth EstBW in the transmission control data 316 of the server 310.

Now, after executing step S505, in step S506 the estimating unit 326 stores the notified bandwidth RepBW as the last notified bandwidth PrevRepBW within the available bandwidth data 329b. The processing then returns to step S202 in FIG. 8. Note that depending on the embodiment, the order of execution of steps S505 and S506 may be reversed.

Now, the significance of the determination in step S503 will be described. A case where the inequality expression (25) holds in step S503 is specifically a case where a value set so as to be greater than the available bandwidth EstBW in step S501 the last time has been stored as the last notified bandwidth PrevRepBW. Also, a case where step S503 is executed is a case in which the excessive delay time ExtraDelay is longer than 300 ms.

Accordingly, the inequality expression (25) holding in step S503 means that verification of whether or not the estimated available bandwidth value EstBW is excessively small as compared to the actual value yielded determination that the estimated available bandwidth value EstBW is not excessively small. This will be described in further detail.

As described above, in step S501 the estimating unit 326 may set the notified bandwidth RepBW greater than the estimated available bandwidth value EstBW in order to verify whether the estimated available bandwidth value EstBW is excessively small in comparison with the actual value. The client 320 notifies the server 310 of the notified bandwidth RepBW that has been set to a greater value in this way.

As a result, the server 310 raises the transmission frame rate, and communication traffic per time increment increase. On the other hand, in the event that the estimated available bandwidth value EstBW is not excessively small as compared to the actual value, increase in communication traffic per time increment increase will result in detention of data on the route from the server 310 to the client 320, and excessive delay time will also be longer.

Thus, in the event that the excessive delay time exceeds the threshold value of 300 ms, the available bandwidth EstBW is smaller than the notified bandwidth RepBW which the client 320 has notified to the server 310 earlier. The reason is that the estimating unit 326 has not yet increased the available bandwidth EstBW.

Thus, in the event that the excessive delay time exceeds the threshold value of 300 ms, the notified bandwidth RepBW which the client 320 has notified to the server 310 the last time is excessively great as compared with the actual available bandwidth. That is to say, the last notified bandwidth PrevRepBW recorded in the current available bandwidth data 329b is excessively great, and it is the available bandwidth EstBW that is appropriate. In other words, the available bandwidth EstBW is not excessively small.

The flow of processing from step S503 to step S502 means that, in a case that confirmation has been made as described above that the available bandwidth EstBW is not excessively small but rather appropriate, the client 320 re-notifies this appropriate available bandwidth EstBW to the server 310.

On the other hand, even if step S501 is not executed, the excessive delay time may exceed 300 ms due to change in network conditions. In such a case, even the current available bandwidth EstBW is excessively great, so the client 320 preferably notifies the server 310 of a value smaller than the current available bandwidth EstBW.

The flow of processing from step S503 to step S218 means handling of increased excessive delay time due to deteriorating network conditions which may occur unrelated to the processing of step S501 by the client 320, as described above.

In the event of deteriorating network conditions unrelated to operation of the client 320, the notified bandwidth RepBW set earlier in step S502 or step S504 is currently stored as last notified bandwidth PrevRepBW, so in step S503 the estimating unit 326 determines that the available bandwidth EstBW is equal to or greater than the last notified bandwidth PrevRepBW, and in step S218 reduces the available bandwidth EstBW. The estimating unit 326 then in step S504 sets the reduced available bandwidth EstBW as a new notified bandwidth RepBW. As a result, in step S505 the reduced available bandwidth EstBW is notified to the server 310.

Note that there may be cases where, after the estimating unit 326 has increased the notified bandwidth RepBW in step S501 to verify whether or not the estimated available bandwidth value EstBW is excessively small as compared to the actual value, not the estimated available bandwidth value EstBW is found to be excessively small. Specifically, this is a case such as follows.

If the estimated available bandwidth value EstBW is excessively small, upon the notified bandwidth RepBW set greater than the estimated available bandwidth value EstBW being notified to the server 310 in step S501, the actual reception bit rate at the client 320 rises. That is to say, the estimated available bandwidth value EstBW may be found to have been excessively small by the fact of the reception bit rate rising after executing step S501.

Specifically, in the event that a rise in the reception bit rate is detected in step S402, determination is made that the estimated available bandwidth value EstBW is excessively small. Accordingly, in this case, in step S403 the estimating unit 326 increases the estimated available bandwidth value EstBW based on the actual reception bit rate that has risen.

In this way, with the fourth embodiment, there are cases wherein determination made in step S402 is related to setting of the notified bandwidth RepBW in step S501. Accordingly, the constant $C_4$ in Expression (18) in step S402 and the constant $C_6$ in Expression (23) in step S501 are preferably set such that the constant $C_4$ is slightly smaller than the constant $C_6$.

Incidentally, with the above-described fourth embodiment, the history of the notified bandwidth included in the available bandwidth data 329b in FIG. 7E is only one past notified bandwidth (i.e., only the last notified bandwidth PrevRepBW). However, depending on the embodiment, the available bandwidth data 329b may include two or more past notified bandwidths. In this case, in step S503 the estimating unit 326 may determine whether or not even one of the two or more past notified bandwidths is greater than the available bandwidth.

In the event that even one of the two or more past notified bandwidths is greater than the available bandwidth, the processing transitions from step S503 to step S502. On the other hand, if all of the two or more past notified bandwidths are equal to or smaller than the available bandwidth, the processing transitions from step S503 to step S218.

Alternatively, in step S503 the estimating unit 326 may use a predetermined constant $C_7$ greater than 1, to determine whether or not there is even one of the two or more past notified bandwidths which is greater than a reference value obtained by multiplying the available bandwidth by the constant $C_7$. In the event that there is even one of the two or more past notified bandwidths which is greater than the reference value, the processing proceeds from step S503 to step S502. On the other hand, if all of the two or more past notified bandwidths are equal to or smaller than the reference value, the processing transitions from step S503 to step S218.

Note that the predetermined constant $C_7$ may be determined such that an inequality expression (27) holds for the relationship with the constant $C_6$ used in step S501, for example.

$$1 < C_7 < (1 + C_6) \quad (27)$$

Also, a ring buffer may be used to store the two or more past notified bandwidths in the available bandwidth data 329b. In step S506, the estimating unit 326 may store the notified bandwidth set this time as the most recent past notified bandwidth.

Thus, an embodiment which uses the available bandwidth data 329b including the two or more past notified bandwidths is well suited to cases where a certain level of time lag occurs from rising of notified bandwidth through rising transmission frame rate and reaching accumulation of delay.

Note that embodiments are not restricted to the first through fourth embodiments, and that various modifications may be made to the first through fourth embodiments. Several perspectives relating to modifications will be exemplarily described now. For example, various modifications of the first through fourth embodiments may be made from the following perspectives, and these modifications may be optionally combined as long as they are not in contradiction with each other.

Several processes in the first through fourth embodiments described above include comparison with a threshold value. For example, comparison with a threshold value is performed in step S217 of FIG. 9, steps S306 and S312 of FIG. 10, step S314 of FIG. 11, steps S402 and S217 of FIG. 13, and steps S217 and S503 of FIG. 14.

The processing of comparison with a threshold value may be processing to determine whether or not a numerical value to be compared exceeds a threshold value, or whether or not a numerical value to be compared is a threshold value or greater, depending on the embodiment. Also, while threshold values of various usages have been exemplarily illustrated in the description above, specific values of the threshold values may be optionally determined as suitable depending on the embodiment.

While various types of data has been illustrated in table format in FIGS. 7A to 7E, a different data format may be used depending on the embodiment.

Also, while a time adjusting command is used with the second through fourth embodiments, some embodiments may not have to use a time adjusting command. Instead, processing of synchronizing the clock of the client 320 with the clock of the server 310 beforehand may be performed, following a protocol such as NTP (Network Time Protocol) or SNTP (Simple Network Time Protocol). For example, remote desktop initialization processing in step S201 in FIG. 8 and step S301 in FIG. 10 may include synchronization processing by NTP or SNTP.

Also, an arrangement may be made regarding an embodiment where a time adjusting command is used, in which the server 310 transmits the time adjusting command not once but multiple times, either regularly or irregularly. In this case, the reception unit 324 of the client 320 updates time difference data 328 each time a time adjusting command is received.

Note that while one client 320 is illustrated in FIG. 6, the server 310 may generate images for each of multiple clients 320, and transmit rendering commands including screen information and time information. In this case, the server 310 manages transmission control data 316 for each client 320. The transmission control data 316 may include identification information to identify the clients 320, so as to manage each client 320.

Also, in the event that there are multiple clients 320, the server 310 executes the processing of FIGS. 10 and 11 independently for each of the multiple clients 320. For example, the server 310 may executes the processing of FIGS. 10 and 11 for each of multiple threads in parallel. That is to say, one thread may correspond to one client 320.

Also, while several specific flowcharts have been exemplarily illustrated as with FIGS. 8 through 11, 13, and 14, the order of execution of the steps may be changed depending on the embodiment, as long as not contradictory. Also, interchangeable steps (i.e., steps which are each independent of each other) may be executed in parallel.

While changing the order of executing steps and omitting steps have been described above by way of several examples, the following modifications may also be made, for example.

For example, while the client 320 preferably notifies the server 310 of excessive delay time as with the second through fourth embodiments, but the server 310 does not have to be notified of excessive delay time. With an embodiment where there is no notification of excessive delay time, the steps of S307, S313, and S314 are omitted.

Also, the client 320 may perform calculation and notification of available bandwidth and excessive delay time each time a rendering command is received, as with the second through fourth embodiments. However, in order to reduce network load due to notification of the available bandwidth and excessive delay time, an arrangement may be made where the client 320 performs notification of available bandwidth and excessive delay time only every $N_1$'th time a rendering command is received (where $N_1 > 1$). In the event that the client 320 does not perform calculation and notification of available bandwidth and excessive delay time, the processing returns to step S202 after executing step S209 in FIG. 8.

Alternatively, the client 320 may calculate the available bandwidth and excessive delay time each time a rendering command is received, and hold history of values of available bandwidth and excessive delay time calculated the latest every $N_2$'th time a rendering command was received (where $N_2 \geq 1$). The client 320 may determine the magnitude of change or trend in change of the available bandwidth, and may determine the magnitude of change or trend in change of the excessive delay time, referencing the history.

An arrangement may be made where the client 320 transmits the available bandwidth and excessive delay time to the server 310 only in the event that the magnitude of change or trend in change of the available bandwidth satisfies a predetermined reference, or in the event that the magnitude of change or trend in change of the excessive delay time satisfies a predetermined reference. For example, the predetermined reference may be a reference such as exemplarily illustrated in the following (20a) through (20c), or may be another reference.

(20a) The value calculated this time has changed a predetermined percentage or more in comparison with one of $N_2$ values in the history (e.g., the greatest value or smaller value).

(20b) The value calculated this time has changed a predetermined percentage or more in comparison with the average of $N_2$ values in the history.

(20c) The value has increased $N_2$ times consecutively, or has decreased $N_2$ times consecutively.

For example, by restricting cases of notifying available bandwidth and excessive delay time as described above, the client 320 may reduce network load due to notification of the available bandwidth and excessive delay time.

Also, the rendering processing in step S209 and the processing of step S210 and on, may be executed in parallel. Step S209 may be executed after the processing of step S210 and on (i.e., the processing up to step S220 or S506).

Alternatively, step S210 may be moved to immediately after step S204. Also, step S213 may be moved to between steps S215 and S216.

The processing of steps S317 through S319 relating to updating of transmission frame rate in the transmission control data 316 is independent from the steps S315 through S316 and S320 through S322 relating to generating and transmitting rendering commands. Accordingly, these two processing may be executed in parallel.

As illustrated in FIGS. 10 and 11, the server 310 according to the second through fourth embodiments executes step S308 at predetermined intervals, and obtains an image of an entire screen. However, depending on the determination results in step S312 or S314, there are cases where the server 310 does not transmit a rendering command corresponding to the obtained image.

The reason that there are cases where "an image is obtained even though conditions to not transmit a rendering command are satisfied" is in order for detection of a moving image region in step S310 to be performable based on change in the image at fixed intervals. However, depending on the embodiment, the steps S308 through S310 may be moved to immediately before step S315, for example. That is to say, detection of the moving image region may be performed at intervals corresponding to a variable transmission frame rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method of an information processing apparatus, the control method comprising:
   obtaining an estimated time when the information processing apparatus is to receive image information transmitted from another information processing apparatus;
   receiving the image information and a first index associated with the image information, the first index indicating a time when the another information processing apparatus transmits the image information;
   calculating a communication index regarding an available bandwidth of a network between the information processing apparatus and the information processing apparatus, wherein the calculating of the communication index further includes:
      decreasing the communication index when a difference between a time when the information processing apparatus receives the image information and the estimated time is greater than a first threshold, and
      increasing the communication index when the difference is equal to or less than a second threshold, the second threshold being less than the first threshold; and
   transmitting the calculated communication index to the another information processing apparatus.

2. The control method according to claim 1, further comprising:
   storing a reference value of the communication index in a storage, wherein:
   the time when the information processing apparatus receives the image information is indicated as a second index; and
   the calculating of the communication index further includes:
      calculating a third index on a basis of the reference value stored in the storage; and
      updating the communication index on a basis of at least the second index and the third index.

3. The control method according to claim 2, wherein the calculating of the third index is based on the reference value, the first index, and a size of the image information.

4. The control method according to claim 2, further comprising:
   updating the reference value stored in the storage to the communication index calculated in the calculating.

5. The control method according to claim 1, wherein the calculating of the communication index further includes:
   calculating a reception bit rate on a basis of each size of the image information received within a predetermined period and length of the predetermined period; and
   calculating the communication index on a basis of the reception bit rate.

6. The control method according to claim 1, wherein the calculating of the communication index further includes calculating the communication index based on a reception bit rate.

7. The control method according to claim 1, wherein the first threshold is greater than 0.

8. The control method according to claim 7, wherein the second threshold is less than or equal to 0.

9. A non-transitory computer-readable storage medium that stores a control program for causing an information processing apparatus to execute a process, the process comprising:

obtaining an estimated time when the information processing apparatus is to receive image information transmitted from another information processing apparatus;

receiving the image information and a first index associated with the image information, the first index indicating a time when the another information processing apparatus transmits the image information;

calculating a communication index regarding an available bandwidth of a network between the information processing apparatus and the another information processing apparatus, wherein the calculating of the communication index further includes:

decreasing the communication index when a difference between a time when the information processing apparatus receives the image information and the estimated time is greater than a first threshold, and increasing the communication index when the difference is equal to or less than a second threshold, the second threshold being less than the first threshold; and transmitting the calculated communication index to the another information processing apparatus.

10. An information processing apparatus comprising:
a memory; and
a processor coupled to the memory, the processor being configured to:

obtain an estimated time when the information processing apparatus is to receive image information transmitted from another information processing apparatus;

receive the image information and a first index associated with the image information, the first index indicating a time when the another information processing apparatus transmits the image information;

calculate a communication index regarding an available bandwidth of a network between the information processing apparatus and the another information processing apparatus, wherein in the calculation of the communication index, the processor is further configured to:

decrease the communication index when a difference between a time when the information processing apparatus receives the image information and the estimated time is greater than a first threshold, and increase the communication index when the difference is equal to or less than a second threshold, the second threshold being less than the first threshold; and transmit the calculated communication index to the another information processing apparatus.

11. A control method of an information processing apparatus, the control method comprising:

transmitting image information and an index associated with the image information to another information processing apparatus on a basis of operation information from the another information processing apparatus, the index indicating a time when the information processing apparatus transmits the image information;

receiving a communication index regarding an available bandwidth of a network between the information processing apparatus and the another information processing apparatus after the transmitting of the image information and the index; and controlling frequency for transmitting the image information to the another information processing apparatus on a basis of the communication index, wherein the communication index is decreased when a difference between a time when the another information processing apparatus receives the image information and an estimated time is greater than a first threshold, the estimated time being a time when the another information processing apparatus is to receive the image information, and the communication index is increased when the difference is equal to or less than a second threshold, the second threshold being less the first threshold.

* * * * *